US012590567B2

(12) United States Patent
Zhou et al.

(10) Patent No.: US 12,590,567 B2
(45) Date of Patent: Mar. 31, 2026

(54) CONTROL METHOD AND APPARATUS FOR WIND TURBINE GENERATOR SET, AND DEVICE

(71) Applicant: JIANGSU GOLDWIND SCIENCE & TECHNOLOGY CO., LTD., Yancheng (CN)

(72) Inventors: Jingwei Zhou, Yancheng (CN); Endi Zhai, Yancheng (CN); Meng Tian, Yancheng (CN)

(73) Assignee: JIANGSU GOLDWIND SCIENCE & TECHNOLOGY CO., LTD., Yancheng (CN)

( * ) Notice: Subject to any disclaimer, the term of this patent is extended or adjusted under 35 U.S.C. 154(b) by 0 days.

(21) Appl. No.: 18/575,913

(22) PCT Filed: Jun. 30, 2022

(86) PCT No.: PCT/CN2022/102746
§ 371 (c)(1),
(2) Date: Jan. 2, 2024

(87) PCT Pub. No.: WO2023/130686
PCT Pub. Date: Jul. 13, 2023

(65) Prior Publication Data
US 2024/0337244 A1    Oct. 10, 2024

(30) Foreign Application Priority Data
Jan. 10, 2022    (CN) ......................... 202210023305.9

(51) Int. Cl.
*F03D 7/02* (2006.01)

(52) U.S. Cl.
CPC ........ *F03D 7/0224* (2013.01); *F05B 2260/70* (2013.01); *F05B 2270/1032* (2013.01);
(Continued)

(58) Field of Classification Search
CPC .. F03D 7/0224; F03D 7/0276; F05B 2260/70; F05B 2270/1031; F05B 2270/1032; F05B 2270/1033
See application file for complete search history.

(56) References Cited

U.S. PATENT DOCUMENTS 10,294,921 B2 * 5/2019 Bønding .................. F03D 9/25
2012/0027587 A1 2/2012 Lee et al.
(Continued)

FOREIGN PATENT DOCUMENTS

CN 102562453 A 7/2012
CN 102900611 A 1/2013
(Continued)

OTHER PUBLICATIONS

Extended European Search Report dated Oct. 22, 2024; Appln. No. 22918142.5.
(Continued)

*Primary Examiner* — Christopher R Legendre

(57)    ABSTRACT

A method and device for controlling a wind turbine and a storage medium. The method includes obtaining a mapping of the wind turbine; determining a starting power for starting an advance pitch control based on the mapping of the wind turbine; in response to a rotation speed of the wind turbine reaching a first rated rotation speed and a power of the wind turbine reaching the starting power, increasing a motor torque and increasing a pitch angle to make the hub thrust of the turbine change by following the limit boundary of hub thrust; and increasing the pitch angle to maintain the rotation speed of the wind turbine at the first rated rotation speed until a target wind speed is reached, in response to the power of the wind turbine being increased to the exceeded power.

20 Claims, 18 Drawing Sheets

(52) U.S. Cl.
CPC ................. *F05B 2270/1033* (2013.01); *F05B 2270/3201* (2013.01)

(56) References Cited

U.S. PATENT DOCUMENTS

| | | | |
|---|---|---|---|
| 2017/0328346 A1 | 11/2017 | Hales et al. | |
| 2018/0034394 A1 | 2/2018 | Kakuya et al. | |
| 2024/0337244 A1* | 10/2024 | Zhou .................... | F03D 7/0224 |

FOREIGN PATENT DOCUMENTS

| | | | |
|---|---|---|---|
| CN | 203420825 | U | 2/2014 |
| CN | 104088753 | A | 10/2014 |
| CN | 114294153 | A | 4/2022 |
| EP | 2 799 711 | A1 | 11/2014 |
| EP | 2 878 809 | A1 | 6/2015 |
| KR | 20120110685 | A | 10/2012 |

OTHER PUBLICATIONS

The International Search Report mailed Oct. 9, 2022; PCT/CN2022/102746.

* cited by examiner

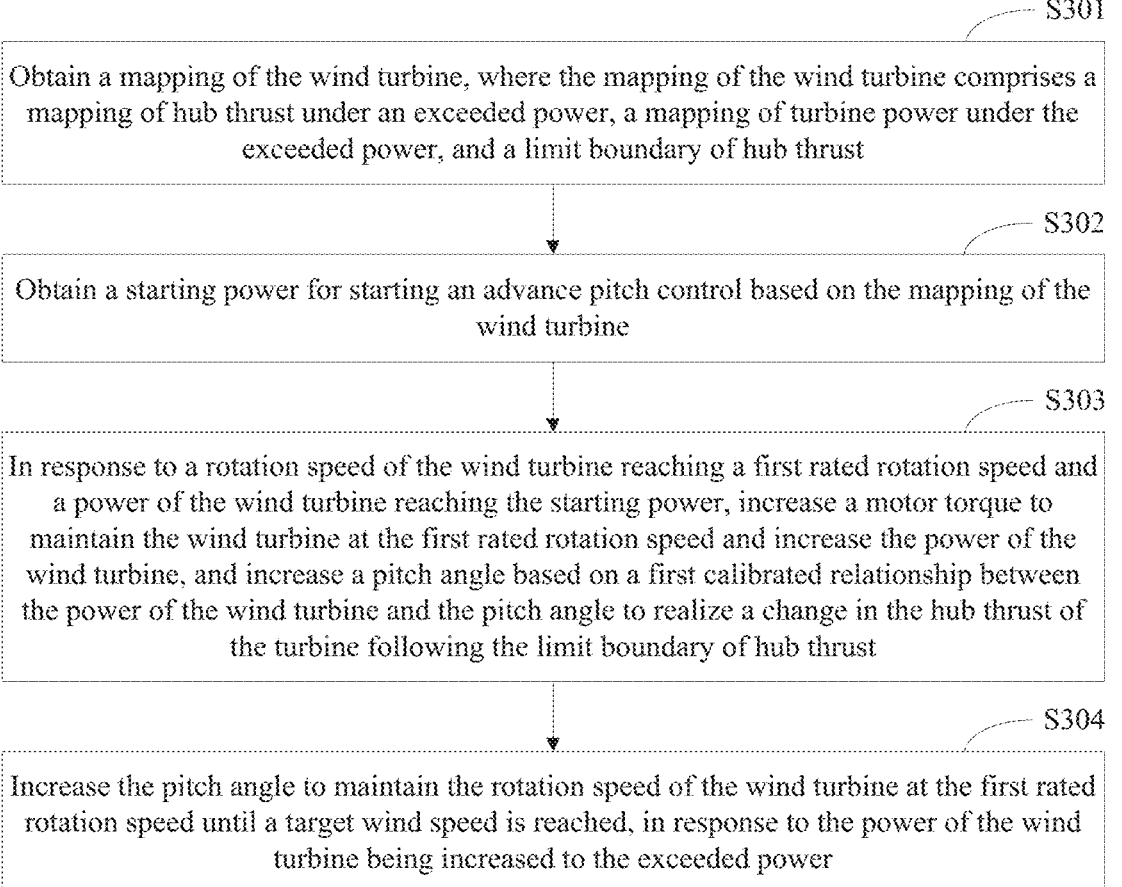

S301

Obtain a mapping of the wind turbine, where the mapping of the wind turbine comprises a mapping of hub thrust under an exceeded power, a mapping of turbine power under the exceeded power, and a limit boundary of hub thrust

S302

Obtain a starting power for starting an advance pitch control based on the mapping of the wind turbine

S303

In response to a rotation speed of the wind turbine reaching a first rated rotation speed and a power of the wind turbine reaching the starting power, increase a motor torque to maintain the wind turbine at the first rated rotation speed and increase the power of the wind turbine, and increase a pitch angle based on a first calibrated relationship between the power of the wind turbine and the pitch angle to realize a change in the hub thrust of the turbine following the limit boundary of hub thrust

S304

Increase the pitch angle to maintain the rotation speed of the wind turbine at the first rated rotation speed until a target wind speed is reached, in response to the power of the wind turbine being increased to the exceeded power

Figure 3

S701

The target wind speed is the third wind speed, and in response to the wind speed reaching the third wind speed, adjust the pitch angle to maintain the rotation speed of the wind turbine at the first rated rotation speed; monitor the wind speed during a second preset time period at a first preset time interval, and calculate an average wind speed in the second preset time period; obtain a target power corresponding to the average wind speed in the second preset time period based on the second calibrated relationship between the power of the wind turbine and the wind speed; and adjust the motor torque to control the wind turbine to reach the target power

S702

In response to the power of the wind turbine being reduced to the rated power and the wind speed reaching the fourth wind speed, obtain the second rated rotation speed and determine a second torque based on a relationship between the rated power and the second rated rotation speed

S703

Adjust the rotation speed of the wind turbine from the first rated rotation speed to the second rated rotation speed, adjust the motor torque to the second torque, and increase the pitch angle to maintain the rotation speed of the wind turbine at the second rated rotation speed, where as the rotation speed of the wind turbine is maintained at the second rated rotation speed and the motor torque is maintained at the second torque, the power of the wind turbine is maintained at the rated power

S704

Increasing the pitch angle to maintain the rotation speed of the wind turbine at the first rated rotation speed in response to the power of the wind turbine being reduced to the rated power and the wind speed reaching the fourth wind speed and the motor torque reaching a third torque, where as the rotation speed of the wind turbine is maintained at the first rated rotation speed and the motor torque is maintained at the third torque, the power of the wind turbine is maintained at the rated power

Figure 7

CONTROL METHOD AND APPARATUS FOR WIND TURBINE GENERATOR SET, AND DEVICE

This application is a National Stage of International Application No. PCT/CN2022/102746, filed Jun. 30, 2022, which claims the benefit of and priority to Chinese Patent Application No. 202210023305.9, filed Jan. 10, 2022, the entireties of which is are hereby incorporated herein by reference.

FIELD

The present disclosure pertains to the field of wind power technology, and in particular to a method and an apparatus for controlling a wind turbine, and a device.

BACKGROUND

A pitch angle adjustable turbine is capable of maintaining an output power of the turbine at a rated power by adjusting a pitch angle. During operation, the turbine maintains the pitch angle at zero in a case that the output power is less than the rated power. After the output power of the turbine during the operation reaches the rated power, a control system adjusts the pitch angle based on a change in the output power of the turbine so as to keep the output power of the turbine at the rated power. After the pitch angle adjustable turbine reaches the rated power, control of a motor torque enables a constant impeller speed of the turbine. In addition, as a wind speed increases, an angle of attack of a turbine blade increases, an axial thrust load at a hub center of the turbine reaches a maximum value, a clearance of a tower reaches a minimum value, which results in a risk of tower sweeping and blade stalling for the wind turbine.

In order to solve the problem of an excessive axial thrust load at the hub center of the turbine when the pitch angle adjustable wind turbine operates near the rated power, an advance pitch control may be applied. However, the advance pitch control may cause drop of a power curve near the rated wind speed, resulting in a loss of power generation.

SUMMARY

In order to solve the above technical problem, the present disclosure provides a method and an apparatus for controlling a wind turbine, and a device, which can reduce an axial thrust load at a hub center of the wind turbine and reduce a loss of power generation.

Technical solutions provided through embodiments of the present disclosure for achieving the above objective are described below.

A method for controlling a wind turbine is provided according to an embodiment of the present disclosure. The method includes: obtaining a mapping of the wind turbine, where the mapping of the wind turbine includes a mapping of hub thrust under an exceeded power, a mapping of turbine power under an exceeded power, and a limit boundary of hub thrust; determining a starting power for starting an advance pitch control based on the mapping of the wind turbine; in response to a rotation speed of the wind turbine reaching a first rated rotation speed and a power of the wind turbine reaching the starting power, increasing a motor torque to maintain the wind turbine at the first rated rotation speed and increase the power of the wind turbine, and increasing a pitch angle based on a first calibrated relationship between the power of the wind turbine and the pitch angle to make the hub thrust of the turbine change by following the limit boundary of hub thrust; and increasing the pitch angle to maintain the rotation speed of the wind turbine at the first rated rotation speed until a target wind speed is reached, in response to the power of the wind turbine being increased to the exceeded power.

An apparatus for controlling a wind turbine is provided according to another embodiment of the present disclosure. The apparatus includes: a first obtaining unit, configured to obtain a mapping of the wind turbine, where the mapping of the wind turbine includes a mapping of hub thrust under an exceeded power, a mapping of turbine power under the exceeded power, and a limit boundary of hub thrust; a second obtaining unit, configured to determine a starting power for starting an advance pitch control based on the mapping of the wind turbine; a first control unit, configured to increase a motor torque in response to a rotation speed of the wind turbine reaching a first rated rotation speed and a power of the wind turbine reaching the starting power, to maintain the wind turbine at the first rated rotation speed and increase the power of the wind turbine, and increase a pitch angle based on a first calibrated relationship between the power of the wind turbine and the pitch angle to make the hub thrust of the turbine change by following the limit boundary of hub thrust; and a second control unit, configured to increase the pitch angle to maintain the rotation speed of the wind turbine at the first rated rotation speed until a target wind speed is reached, in response to the power of the wind turbine being increased to the exceeded power.

A computer-readable storage medium storing a computer program is further provided according to an embodiment of the present disclosure. The computer program, when executed by a processor, implements the method according to any one of the above embodiments.

A computing device is further provided according to an embodiment of the present disclosure. The computing device includes: at least one processor; and at least one memory, where the memory stores a computer program, and the computer program, when executed by the at least one processor, implements the method according to any one of the above embodiments.

From the above technical solutions, the present disclosure has the following beneficial effects.

The present disclosure provides a method and an apparatus for controlling a wind turbine, and a device, with which the mapping of the wind turbine can be obtained. The mapping of the wind turbine includes a mapping of hub thrust under an exceeded power, a mapping of turbine power under the exceeded power, and a limit boundary of hub thrust. The starting power for starting an advance pitch control is obtained based on the mapping of the wind turbine. In a case that the rotation speed of the wind turbine reaches the first rated rotation speed and the power of the wind turbine reaches the starting power, the motor torque is increased to maintain the wind turbine at the first rated rotation speed and increase the power of the wind turbine. The pitch angle is increased based on a first calibrated relationship between the power of the wind turbine and the pitch angle to make the hub thrust of the turbine change by following the limit boundary of hub thrust. In this way, a peak in the mapping of hub thrust can be eliminated by using the set limit boundary of hub thrust. Further, the pitch angle is increased to maintain the rotation speed of the wind turbine at the first rated rotation speed until the target wind speed is reached, in response to the power of the wind turbine being increased to the exceeded power. The rotation speed of the wind turbine is maintained at the first rated rotation speed and the motor torque, after the exceeded power is reached, remains unchanged at a first torque. Therefore, the power of the wind turbine is maintained at the exceeded power. Since the exceeded power is greater than a rated power, by increasing the power of the wind turbine to the exceeded power and maintaining for a period of time until the wind speed reaches the target wind speed, a power loss caused by an advance pitch control at the rated power is compensated and a loss of power generation is reduced.

BRIEF DESCRIPTION OF THE DRAWINGS

The accompanying drawings are for providing a further understanding of the present disclosure, and form a part of the present disclosure. The drawings, together with embodiments of the present disclosure, are for explaining the present disclosure, and do not constitute any limitation to the present disclosure. In the accompanying drawings:

FIG. 3 is a flow chart of a method for controlling a wind turbine according to an embodiment of the present disclosure;

FIG. 7 is a flow chart of a method for controlling a wind turbine according to another embodiment of the present disclosure;

DETAILED DESCRIPTION

In order to make the above objectives, features and advantages of the present disclosure more obvious and understandable, embodiments of the present disclosure are described in further detail below in conjunction with the accompanying drawings and specific implementations.

In order to facilitate understanding and explanation of the technical solutions provided in the embodiments of the present disclosure, the background involved in the embodiments of the present disclosure is first introduced below.

Figure 1A:
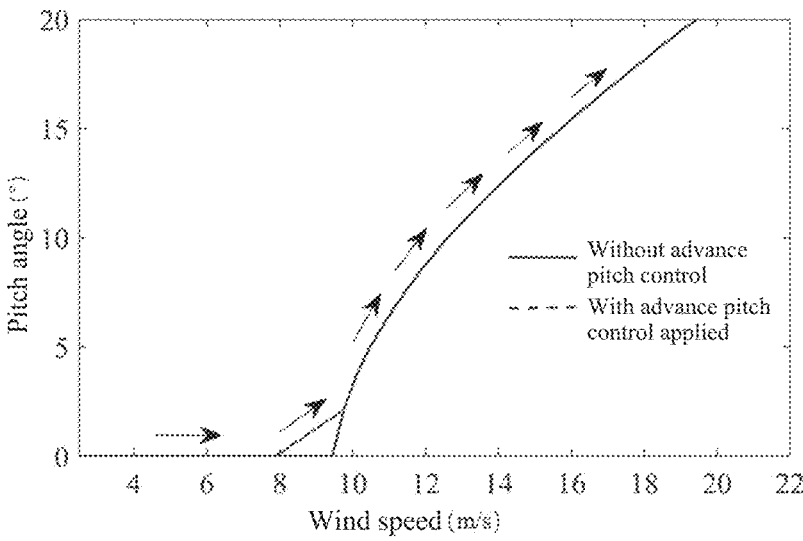
FIG. 1a is a schematic diagram showing a comparison of pitch angles before and after an advance pitch control according to an embodiment of the present disclosure.
Figure 1B:
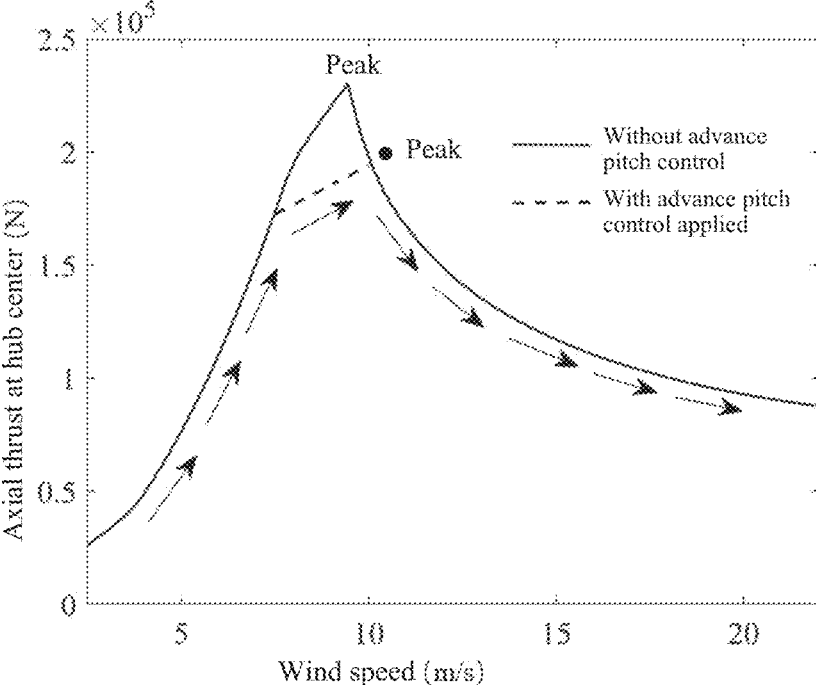
FIG. 1b is a schematic diagram showing a comparison of turbine hub thrusts before and after an advance pitch control according to an embodiment of the present disclosure.
Figure 1C:
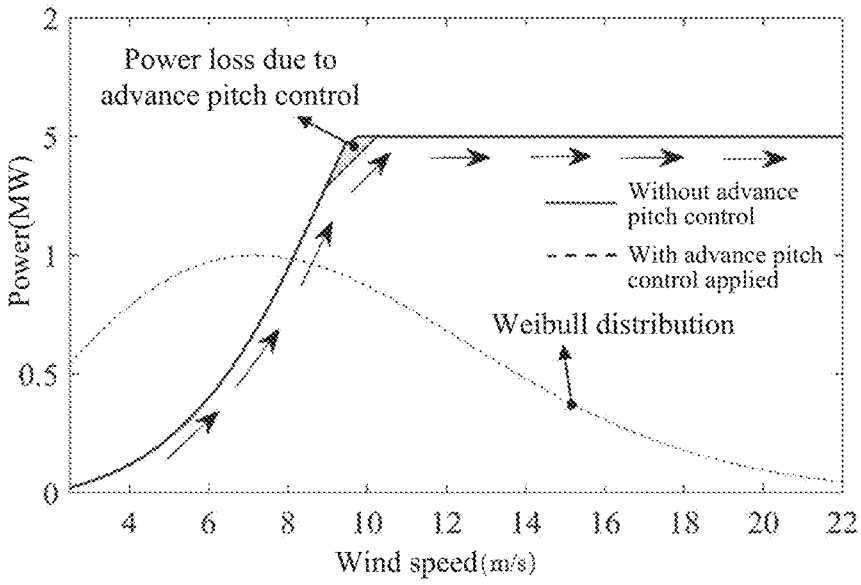
FIG. 1c is a schematic diagram showing a comparison of turbine powers before and after an advance pitch control according to an embodiment of the present disclosure.

Reference is made to FIG. 1a, FIG. 1b and FIG. 1c. FIG. 1a is a schematic diagram showing a comparison of pitch angles before and after an advance pitch control according to an embodiment of the present disclosure. FIG. 1b is a schematic diagram showing a comparison of turbine hub thrusts before and after an advance pitch control according to an embodiment of the present disclosure. FIG. 1c is a schematic diagram showing a comparison of turbine powers before and after an advance pitch control according to an embodiment of the present disclosure.

In one or more embodiments, a wind turbine in the present disclosure refers to a pitch angle adjustable wind turbine, as shown by solid lines in FIGS. 1a and 1c where no advance pitch control is applied. Generally, a basic control strategy for the pitch angle adjustable wind turbine is as follows. During an operation of the wind turbine, in a case that an output power of the wind turbine is less than a rated power, no adjustment is performed on the pitch angle of the wind turbine, and the pitch angle is maintained unchanged at a zero position, that is, blades of the wind turbine remain in an open state. In a case that a wind speed reaches a rated wind speed, the output power of the wind turbine reaches the rated power. After the output power of the wind turbine reaches the rated power, a control system participates in a closed-loop control. The pitch angle is increased nonlinearly with the wind speed, so that an angle of attack of blades of the wind turbine changes accordingly, thereby the speed/power is maintained at the rated power. The pitch angle may refer to an angle between an airfoil chord at the top of a blade of the wind turbine and a plane of rotation. The angle of attack may refer to an angle between an airflow velocity vector and the airfoil chord.

However, in a case that the power of the pitch angle adjustable turbine reaches the rated power, control of a motor torque makes a rotation speed of an impeller constant. As the wind speed increases, the angle of attack of the blade increases, causing a hub thrust to reach the maximum, such as a peak thrust shown with the solid line in in FIG. 1b where no advance pitch control is applied. Meanwhile, a clearance between the blades of the wind turbine and a tower is minimal, resulting in a risk of tower sweeping and blade stalling for the wind turbine.

The hub thrust may refer to a sum of generated forces perpendicular to a plane of the impeller by three blades of the turbine absorbing an aerodynamic force. The clearance of the tower refers to a closest distance from a surface of the blade and a surface of the tower as the blade rotates passing the tower. The clearance of the tower is minimum usually when the power of the wind turbine reaches the rated power. The blade stalling may refer to the situation that a separation point of airflow moves forward, a vortex area on the back of the blade expands from a tail end to the back of the blade, a detachment becomes more serious, and even some flow channels are blocked. For a two-dimensional airfoil, a working section in which a lift coefficient shows a downward trend as the angle of attack of the blade increases is called blade stalling. For a three-dimensional blade, a situation in which a portion of an airfoil flow state changes from laminar flow to turbulent flow so that the impeller cannot obtain sufficient lift from the air is called blade stalling.

Hence, an advance pitch control may be applied to solve problems caused by an excessive hub thrust of the wind turbine, such as a reduced service life of components of the wind turbine, the tower sweeping of the blades of the wind turbine, and the blade stalling of the wind turbine. The advance pitch control is to perform pitch control in advance before a rated wind speed is reached, that is, before a rated power is reached. Specifically, a power for starting the advance pitch control, a target pitch angle, and a correspondence relationship between power and pitch angle are preset. It can be understood that the power for starting the advance pitch control corresponds to a pitch angle 0°, and the rated power corresponds to the target pitch angle. In response to reaching the power for starting the pitch control, the pitch angle (usually referred to as a "minimum pitch angle") starts to be changed based on the set correspondence relationship between power and pitch angle. The power of the wind turbine is increased through the adjustment on the pitch angle. The power of the wind turbine reaches the rated power when the target pitch angle is reached. Then the rated power of the wind turbine is maintained through a closed-loop control on the pitch angle. As an alternative example, the power for starting the advance pitch control is equal to 70% to 90% of the rated power, and the target pitch angle is 1° to 3°.

As shown by the dotted line in FIG. 1a, application of the advance pitch control causes a shape change in the curve of the pitch angle. In addition, as shown by the dotted line in FIG. 1b, the application of the advance pitch control avoids an excessive peak hub thrust caused by an excessive angle of attack of the blade, and thereby the hub thrust of the wind turbine is reduced. However, as shown by the dotted line and shadow in FIG. 1c, the application of the advance pitch control causes a drop of the curve of a turbine power near the rated wind speed, resulting in a loss of power generation. That is, the hub thrust of the turbine is reduced with an expense of degrading performance of the wind turbine, which causes an economic loss. An annual power generation refers to a sum of power generated by the wind turbine in one year. The annual power generation is equal to an integral of (power×Weibull distribution×hours for power generation). As shown in FIG. 1c, the Weibull distribution is a continuous probability distribution, which is usually adopted for describing an occurrence probability of a wind speed in a certain region. A probability density function of Weibull distribution is adjustable based on a shape factor and a scale factor. In addition, as shown by the dotted line in FIG. 1b, although the hub thrust of the wind turbine is reduced, there is still a peak of the hub thrust.

Figure 2:
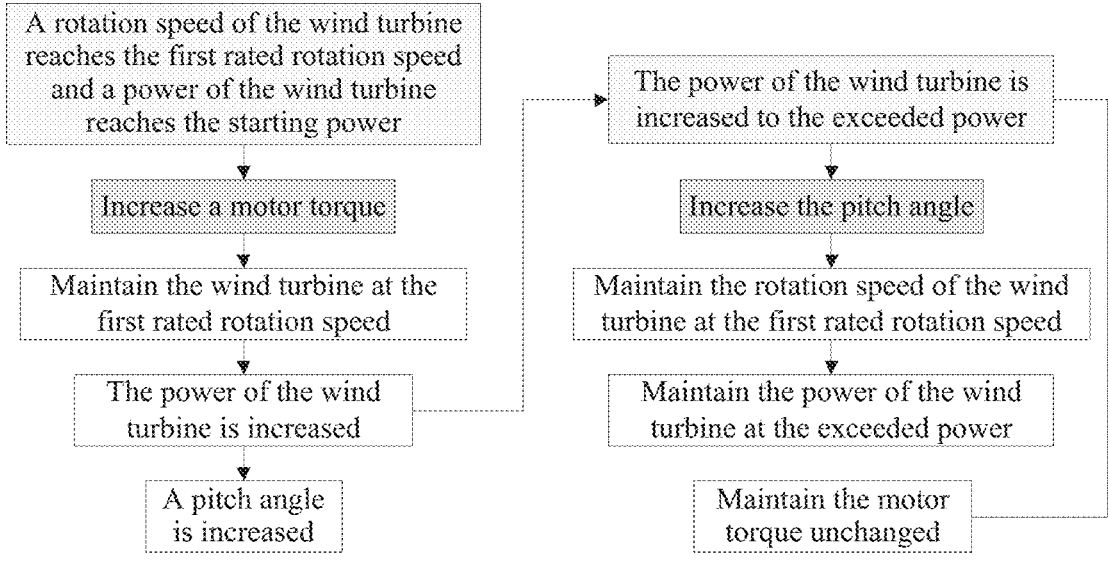
FIG. 2 is a schematic diagram of an exemplary application scenario according to an embodiment of the present disclosure.

Hence, a method and an apparatus for controlling a wind turbine, a computer-readable storage medium and a computing device are provided according to embodiments of the present disclosure. In order to facilitate understanding of the method for controlling a wind turbine provided in an embodiment of the present disclosure, an exemplary application scenario is described below with reference to FIG. 2. FIG. 2 is a schematic diagram of an exemplary application scenario according to an embodiment of the present disclosure.

In a practical application, a mapping of the wind turbine is obtained first. The mapping includes a mapping of hub thrust under an exceeded power, a mapping of turbine power under the exceeded power, and a limit boundary of hub thrust. Then, a starting power for starting an advance pitch control is obtained based on the mapping of the wind turbine. The starting power refers to a power at which the advance pitch control is started. The starting power is less than the rated power of the wind turbine. The exceeded power is greater than the rated power of the wind turbine.

In response to a rotation speed of the wind turbine reaching a first rated rotation speed and a power of the wind turbine reaching the starting power, a motor torque is increased to maintain the wind turbine at the first rated rotation speed and increase the power of the wind turbine. In addition, the pitch angle is increased based on a first calibrated relationship between power of the wind turbine and pitch angle to realize a change of the turbine hub thrust following the limit boundary of the hub thrust.

The pitch angle is increased to maintain the rotation speed of the wind turbine at the first rated rotation speed until a target wind speed is reached, in response to the power of the wind turbine being increased to the exceeded power. At this stage, as the power of the wind turbine increases to the exceeded power, the motor torque reaches a first torque and maintained at the first torque. The rotation speed of the wind turbine is maintained at the first rated rotation speed and the motor torque is maintained at the first torque, so that the power of the wind turbine is maintained at the exceeded power.

Those skilled in the art can understand that the schematic framework diagram shown in FIG. 2 is only an example in which an embodiment of the present disclosure can be implemented. An application scope of the embodiments of the present disclosure is not limited by any aspect of this framework.

Based on the above description, the method for controlling a wind turbine provided in the present disclosure is described in detail below with reference to the drawings.

Reference is made to FIG. 3, which is a flow chart of a method for controlling a wind turbine according to an embodiment of the present disclosure. In one or more embodiments, a wind turbine in the present disclosure refers to a pitch angle adjustable wind turbine. As shown in FIG. 3, the method may include S301 to S304.

In S301, a mapping of the wind turbine is obtained. The mapping of the wind turbine includes a mapping of hub thrust under an exceeded power, a mapping of turbine power under the exceeded power, and a limit boundary of hub thrust.

In one or more embodiments, the wind turbine in the present disclosure refers to a pitch angle adjustable wind turbine. Conventionally, the advance pitch control is applied to reduce the hub thrust of the pitch angle adjustable wind turbine. There is still a great peak in the mapping of hub thrust, which reduces a power of the wind turbine. In order to further reduce the hub thrust of the wind turbine and compensate for a power loss of the wind turbine caused by application of the advance pitch control under the rated power, according to an embodiment of the present disclosure, a limit boundary of the hub thrust is set in addition to the advance pitch control, so as to reduce the hub thrust of the wind turbine. In addition, after reaching the rated power, power boost is applied to compensate for the power loss of the wind turbine due to the advance pitch control.

It can be understood that the mapping represents a mapping relationship between two variables. The mapping may be in various forms, such as curves, discrete points, and fitted line segments. In one or more embodiments, the exemplary description is made with curves, but the present disclosure is not limited thereto. In a case that the mapping is represented as a curve, the mapping of hub thrust is represented as a curve of the hub thrust of the wind turbine.

Hence, a mapping of the wind turbine is obtained first. The mapping of the wind turbine includes a mapping of hub thrust under an exceeded power, a mapping of turbine power under the exceeded power, and a limit boundary of the hub thrust. The limit boundary of the hub thrust is a kind of mapping.

Before obtaining the mapping of hub thrust under the exceeded power and the mapping of the turbine power under the exceeded power, the exceeded power has to be determined first. Typically, the wind turbine operates at a rated power. The power boost refers to a state in which the wind turbine operates at an exceeded power exceeding the rated power in a wind speed section. The exceeded power refers to a power of the wind turbine in the power boost. That is, the exceeded power is greater than the rated power of the wind turbine. Generally, an increase in the power causes the wind turbine to operate at a higher maximum torque. The increase in the torque causes an increase of a current in the motor. Therefore, components of a converter bear a greater current, and a cost of a cooling system is increased. In addition, a supporting structure of the motor needs to be strengthened to satisfy the torque under the exceeded power. Therefore, setting of the exceeded power is limited by costs of the converter, generator and other components of the wind turbine. Hence, a cost and design margin of the components such as the converter may be taken into account to determine whether the wind turbine is able to generate the exceeded power and determine a magnitude of the exceeded power. In an embodiment of the present disclosure, the set exceeded power of the wind turbine must meet a requirement for the wind turbine to generate the exceeded power. As an alternative example, the exceeded power may be 1.02 to 1.2 times the rated power of the wind turbine, preferably 1.04 to 1.07 times the rated power of the wind turbine.

Figure 4:
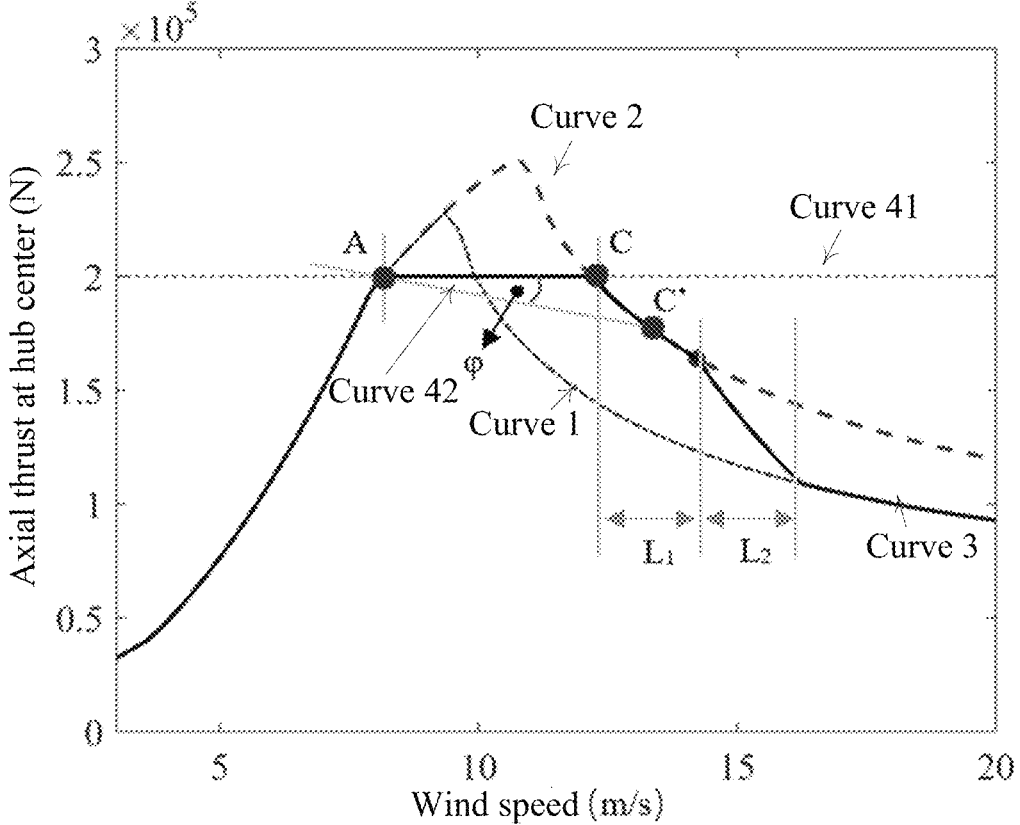
FIG. 4 is a schematic diagram of a design parameter according to an embodiment of the present disclosure.

Therefore, after determining the exceeded power, according to the basic control strategy of the pitch angle adjustable wind turbine and a blade element momentum theory, the mapping of hub thrust under the exceeded power (which may be as curve 2 in FIG. 4) and the mapping of turbine power under the exceeded power can be obtained for the wind turbine (the pitch angle adjustable wind turbine). FIG. 4 is a schematic diagram of a design parameter according to an embodiment of the present disclosure. FIG. 4 specifically shows a schematic diagram of a mapping of hub thrust. In the mapping of the hub thrust, an abscissa represents a wind speed and an ordinate represents the hub thrust of the wind turbine. In the mapping of the turbine power, an abscissa represents a wind speed, and an ordinate represents a power of a wind turbine. It can be understood that the curve 2 in FIG. 4 is different from the basic control strategy as in FIG. 1a and FIG. 1c in that: the curve 2 in FIG. 4 is finally maintained at the exceeded power, while curves in FIG. 1a and FIG. 1c are finally maintained at the rated power of the wind turbine.

In addition, curve 1 in FIG. 4 represents the mapping of the hub thrust obtained for the wind turbine operating at the rated power through the basic control strategy (in one or more embodiments, the mapping of the hub thrust may be a mapping of axial thrust at a hub center). Curve 2 in FIG. 4 represents the mapping of the hub thrust obtained for the wind turbine operating at the exceeded power through the basic control strategy. Curve 3 in FIG. 4 represents the mapping of the hub thrust obtained for the wind turbine through the method provided in the embodiment of the present disclosure. In a practical application, either operating at the rated power as shown by curve 1 or operating at the exceeded power as shown by curve 2, a peak hub thrust of the wind turbine is generated as the rated power or exceeded power is reached. It can be seen that although the peak hub thrust of the wind turbine is reduced through the advance pitch control, the peak still exists.

Hence, in addition to the advance pitch control, a limit boundary of hub thrust is set according to an embodiment of the present disclosure in order to limit the hub thrust of the turbine. In this way, an excessive peak hub thrust of the turbine can be reduced during the operation of the wind turbine, and the hub thrust of wind turbine is effectively reduced. An extreme load at the hub center of the wind turbine may be dependent on a strength that the tower, blades and other components can withstand. In an embodiment of the present disclosure, the limit boundary of hub thrust may be set based on the extreme load at the hub center of the wind turbine.

In a possible implementation, the limit boundary of hub thrust may be a straight line parallel to the horizontal axis, a slope, or a family of curves fitted by polynomials. In an embodiment of the present disclosure, since the power is to be boosted to reach the exceeded power after the rated power is reached, a thrust peak generated in an operation maintaining the exceeded power is caused by the exceeded power. Therefore, a purpose is to eliminate the peak thrust in curve 2 as shown in FIG. 4. As shown in FIG. 4, in a case that the limit boundary of the hub thrust is a straight line (curve 41 in FIG. 4) parallel to the horizontal axis, curve 2 and curve 41 intersect at point A and point C. The peak thrust included in a curve segment between point A and point C of curve 2 is to be eliminated. Point A is a starting point for starting the advance pitch control. In a case that the limit boundary of the hub thrust is a segment between point A and point C in curve 41 (which may be understood as curve 41), the purpose of eliminating the peak in curve 2 and limiting the hub thrust of the turbine can be achieved. In this case, as an alternative example, the thrust corresponding to the limit boundary of the hub thrust limit is preferably 85% of the extreme load at the hub center of the wind turbine, and the thrust optionally ranges from 80% to 95% of the extreme load at the hub center of the wind turbine. That is, the thrust corresponding to the segment between point A and point C in curve 41 (i.e., the ordinate in FIG. 4) may be set to satisfy the preferred value of the thrust or the optional range of the thrust.

As shown in FIG. 4, in a case that the limit boundary of the hub thrust is a slope (curve 42 in FIG. 4), curve 2 and curve 42 intersect at point A and point C'. The peak thrust included in a curve segment between point A and point C' in curve 2 is to be eliminated. In a case that the hub thrust of the turbine is a segment between point A and point C' in curve 42, the purpose of eliminating the excessive peak in curve 2 and limiting the hub thrust of the turbine can be achieved. In this case, an angle between the limit boundary of the hub thrust (i.e., curve 42 in FIG. 4) and the horizontal axis is φ as in FIG. 4. As an alternative example, φ may satisfy φ∈[−20°, 20° ], preferably be 0°. It can be understood that the limit boundary of hub thrust is a straight line parallel to the horizontal axis in a case that φ is 0°. In one or more embodiments, φ is not 0°, and the thrust corresponding to point A and the thrust corresponding to point C' (i.e., ordinates in FIG. 4) may both satisfy the preferred value of the thrust or the optional range of the thrust. In setting of the limit boundary of the hub thrust based on the extreme load at the hub center of the wind turbine, the limit boundary of hub thrust is not specifically limited, as long as it is reasonable. For convenience of description, the following embodiments of the present disclosure are described by taking an example where the limit boundary of hub thrust is parallel to the horizontal axis.

In one or more embodiments, there is a further condition that the designed limit boundary of hub thrust needs to satisfy, details of which may refer to a description of S302.

In S302, a starting power for starting an advance pitch control is determined based on the mapping of the wind turbine.

In a practical application, after the wind turbine starts to operate, the power of the wind turbine first increases as a wind speed increases. In an embodiment of the present disclosure, the advance pitch control strategy is applied for an advance pitch control. Thus, the starting power for starting the advance pitch control may be set. Before the power of the wind turbine reaches the starting power, a motor torque is adjusted to increase a rotation speed of the wind turbine and increase the power of the wind turbine. The advance pitch control is started when the power of the wind turbine reaches the starting power. In an embodiment of the present disclosure, the starting power is set based on the mapping of the wind turbine. In one or more embodiments, the switching power is less than a rated power of the wind turbine.

A principle of determining the starting power is explained below in order to facilitate understanding of a process thereof.

Figure 5A:
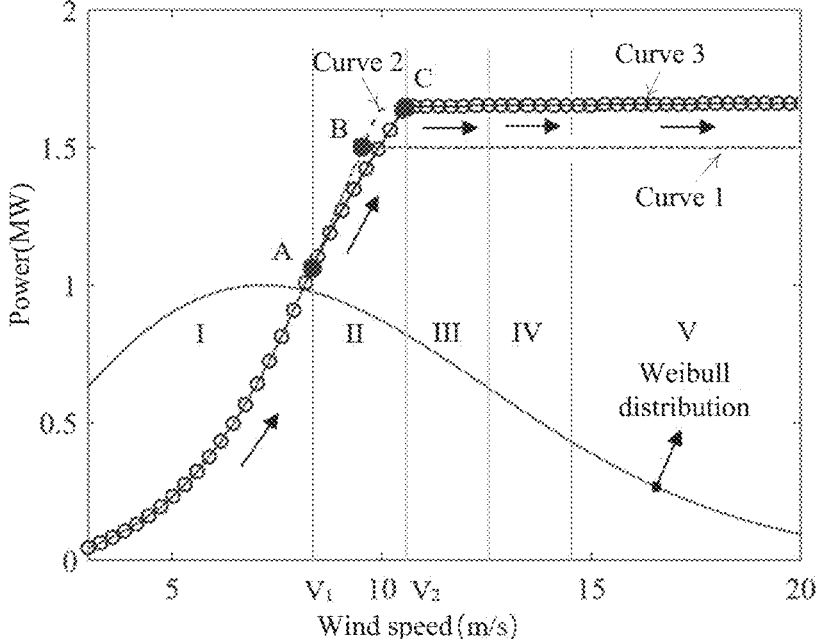
FIG. 5a is a schematic graph showing a curve of a power of a wind turbine according to an embodiment of the present disclosure.
Figure 5B:
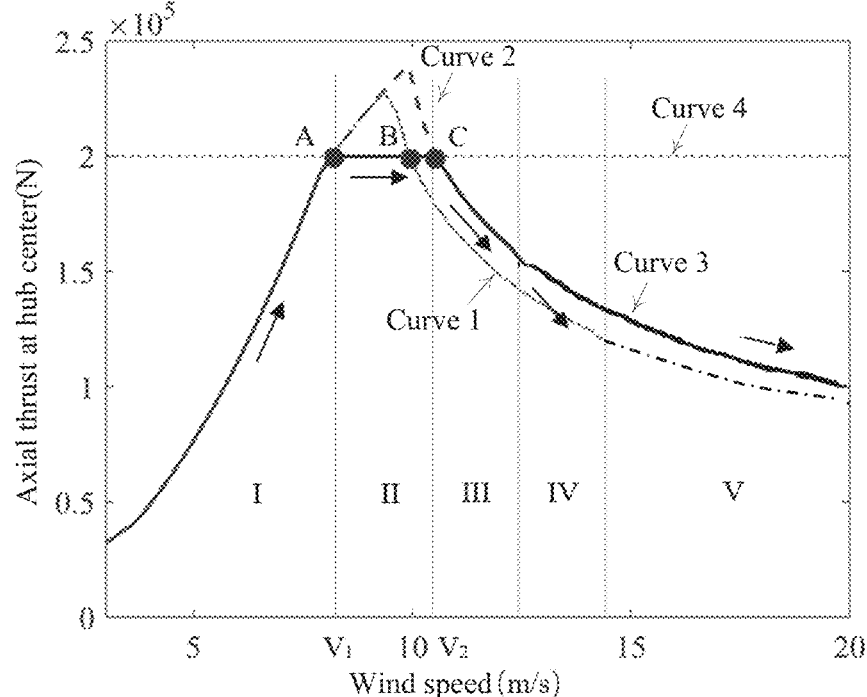
FIG. 5b is a schematic graph showing a curve of a turbine hub thrust according to an embodiment of the present disclosure.
Figure 5C:
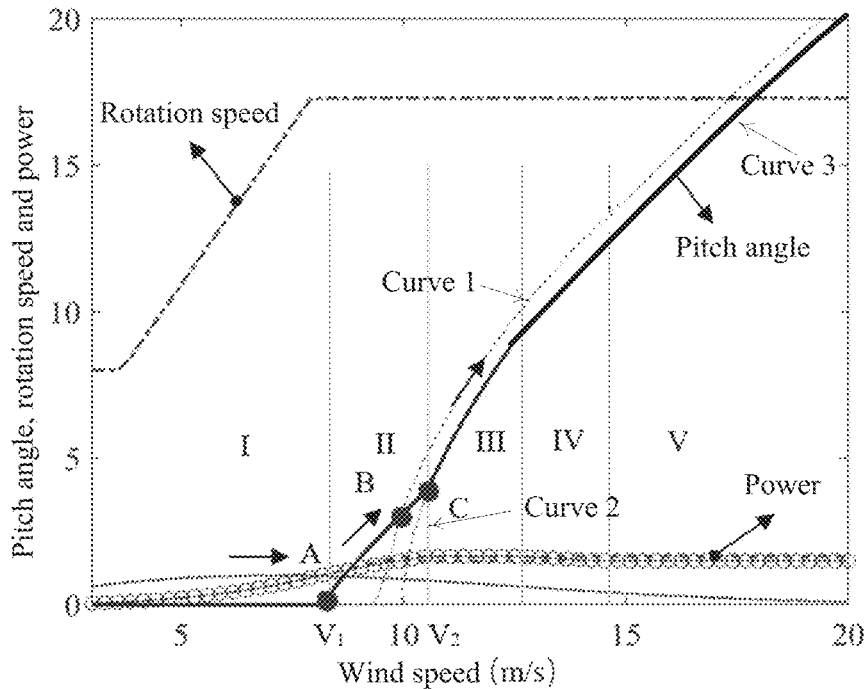
FIG. 5c is a schematic graph of a pitch angle and a rotation speed according to an embodiment of the present disclosure.

The following description is made by taking FIG. 5a, FIG. 5b and FIG. 5c as examples. Reference is made to FIG. 5a, FIG. 5b and FIG. 5c. FIG. 5a is a schematic graph showing a curve of a power of a wind turbine according to an embodiment of the present disclosure. FIG. 5b is a schematic graph showing a curve of a hub thrust of a wind turbine according to an embodiment of the present disclosure. FIG. 5c is a schematic graph showing a curve of a pitch angle and a curve of a rotation speed according to an embodiment of the present disclosure.

In a practical application, after the exceeded power and the limit boundary of hub thrust are determined in S301, the mapping of turbine power under the exceeded power (such as curve 2 in FIG. 5a), the mapping of hub thrust under the exceeded power (such as curve 2 in FIG. 5b) and a curve of a pitch angle under the exceeded power (such as curve 2 in FIG. 5c) are calculated based on the blade element momentum theory. After determining the limit boundary of hub thrust (curve 4 in FIG. 5b), point A which is a first thrust intersection point of curve 2 and curve 4 in FIG. 5b and point C which is a second thrust intersection point of curve 2 and curve 4 in FIG. 5b are obtained. Based on the curves, curve

3 in FIG. 5a, curve 3 in FIG. 5b and curve 3 in FIG. 5c for guiding and controlling an operation of the wind turbine in an embodiment of the present disclosure are determined. In one or more embodiments, curve 3 in FIG. 5a, curve 3 in FIG. 5b, and curve 3 in FIG. 5c are realized through the method for controlling a wind turbine provided in an embodiment of the present disclosure. From another perspective, curve 3 in FIG. 5a, curve 3 in FIG. 5b, and curve 3 in FIG. 5c may be used in guiding and controlling the operation of the wind turbine according to an embodiment of the present disclosure. From these curves, a control parameter for guiding and controlling the operation of the wind turbine can be obtained, and such control parameter is adopted to guide and control the operation of the wind turbine.

In a specific implementation, each of curve 3 in FIG. 5a, curve 3 in FIG. 5b and curve 3 in FIG. 5c may be obtained as three segments, i.e., a segment before point A, a segment between point A and point C, and a segment after point C. First, segments before point A in curve 3 in FIG. 5a, curve 3 in FIG. 5b, and curve 3 in FIG. 5c are set to be the same as segments before point A in curve 2 in FIG. 5a, curve 2 in FIG. 5b, and curve 2 in FIG. 5b, respectively. Thus, segments before point A in curve 3 in FIG. 5a, curve 3 in FIG. 5b, and curve 3 in FIG. 5c are obtained.

A thrust curve segment between A and C in curve 3 in FIG. 5b is set as a segment between point A and point C in curve 4. Hence, the thrust curve segment between A and C in curve 3 in FIG. 5b is determined. Based on the thrust curve segment between A and C in curve 3 in FIG. 5b (that is, the segment between point A and point C in curve 4) and the blade element momentum theory, a segment of a power curve and a segment of a pitch angle curve between point A and point C in curve 3 in FIG. 5a and FIG. 5c are obtained. It can be understood that the power corresponding to point C in FIG. 5a reaches the exceeded power.

Then, a segment of the power curve after point C in curve 3 in FIG. 5a is set as the segment of the power curve after point C in curve 2. Hence, the segment of the power curve after point C in curve 3 in FIG. 5a is determined. Based on the power curve after point C in curve 3 in FIG. 5a (that is, the power curve after point C in curve 2) and the blade element momentum theory, a segment of the thrust curve and a segment of the pitch angle curve after point C in curve 3 in FIG. 5b and FIG. 5c are obtained. Based on the above, curve 3 in FIG. 5a, curve 3 in FIG. 5b and curve 3 in FIG. 5c for guiding and controlling an operation of the wind turbine in an embodiment of the present disclosure are obtained.

Curve 3 in FIG. 5a may be a curve of a power of a turbine power for guiding and controlling the operation of the wind turbine. Curve 3 (i.e., the solid line) in FIG. 5b may be a mapping of hub thrust for guiding and controlling the operation of the wind turbine. Curve 3 (i.e., the solid line) in FIG. 5c may be a curve of a pitch angle for guiding and controlling the operation of the wind turbine. Before controlling the wind turbine, a control parameter may be obtained based on curve 3 in FIG. 5a, curve 3 in FIG. 5b, and curve 3 in FIG. 5c. The obtained control parameter may be used for an actual control of the wind turbine. The starting power is one of control parameters.

Based on the above, an implementation of determining the starting power for starting an advance pitch control based on the mapping of the wind turbine is provided, including a first step and a second step.

In the first step, a first thrust intersection point and a second thrust intersection point where the mapping of hub thrust under an exceeded power intersects the limit boundary of hub thrust, a first wind speed corresponding to the first thrust intersection point, and a second wind speed corresponding to the second thrust intersection point are obtained, where the first wind speed corresponding to the first thrust intersection point is less than the second wind speed corresponding to the second thrust intersection point.

For the wind turbine, the mapping of hub thrust under the exceeded power is as curve 2 in FIG. 5*b*, and the limit boundary of hub thrust is as curve 4 in FIG. 5*b*. The first thrust intersection point is point A in FIG. 5*b*, and the second thrust intersection point is point C in FIG. 5*b*. The first wind speed corresponds to the first thrust intersection point is represented as V1, and the second wind speed corresponding to the second thrust intersection point is represented as V2. V1 is less than V2. From curve 3 in FIG. 5*a*, V2 is a wind speed at which the power of the wind turbine reaches the exceeded power, that is, V2 is a rated wind speed.

In the second step, the starting power corresponding to the first wind speed in the mapping of turbine power under the exceeded power is determined based on the first wind speed, where the starting power indicates a power at which an advance pitch control is started.

After the first wind speed is determined, the starting power corresponding to the first wind speed in the mapping of turbine power under the exceeded power (curve 2 in FIG. 5*a*) is determined based on the first wind speed. The starting power corresponds to point A in FIG. 5*a*.

In FIG. 5*a*, a curve before point A (including point A) in curve 2 is the same as a curve before point A in curve 3. Therefore, in practice, the power corresponding to the first wind speed in curve 3 of FIG. 5*a* is the starting power.

Furthermore, point A is a starting point for activating the advance pitch control. In one or more embodiments, the wind speed corresponding to point A is greater than the wind speed corresponding to the rated rotation speed. Therefore, when the starting power is reached, the power of the wind turbine can reach the first rated rotation speed (i.e., a typical rated rotation speed of the wind turbine). In one or more embodiments, since point A is set in S301 as the intersection point between the limit boundary of hub thrust and the mapping of hub thrust under the exceeded power of the wind turbine, the limit boundary of hub thrust needs to meet a condition. The condition may be that: the wind speed corresponding to the intersection point between the limit boundary of hub thrust and the mapping of hub thrust under the exceeded power of the wind turbine is greater than the wind speed corresponding to the rated rotation speed.

In one or more embodiments, after S302 and before S303, in response to the power of the wind turbine being less than the starting power, a motor torque is adjusted to increase a rotation speed of the wind turbine and increase the power of the wind turbine.

As an alternative example, the motor torque is adjusted based on an optimal gain control to increase the rotation speed of the wind turbine. In an implementation, the starting power is determined. The power of the wind turbine is less than the starting power when the wind turbine starts to operate. The motor torque is adjusted based on the optimal gain control to increase the rotation speed of the wind turbine and increase the power of the wind turbine. Under the optimal gain control, the wind turbine operates at a state having an optimal power coefficient. The power coefficient may be calculated as: wind turbine power/((0.5)×Sweeping area×Air density×The third power of wind speed). Under an optimal gain control, the pitch angle of the wind turbine may be 0°. The optimal gain control is commonly applied to the wind turbine (pitch angle adjustable wind turbine) before reaching the first rated rotation speed, and is not described in detail here.

As can be known from the above, a mapping of turbine power under a rated power, a mapping of hub thrust under the rated power, a mapping of pitch angle under the rated power, a mapping of turbine power under the exceeded power, a mapping of hub thrust under the exceeded power, and a mapping of pitch angle under the exceeded power can be obtained in a general condition. These mappings, although not satisfying, may serve as the basis for obtaining a mapping instructing an operation of the wind turbine, as shown by curve 3 in each relevant Figure. Therefore, a mapping result after the operation of the wind turbine is similar to the mapping for instructing control of the wind turbine. Hence, the method for controlling a wind turbine of the embodiment of the present disclosure may be regarded as a method for optimizing a power curve of the wind turbine. In the method, the hub thrust under the exceeded power is obtained in S302 in the case that the wind turbine operates at a standard rated power. Hence, a limit boundary of thrust at the rated power and a limit boundary of thrust at the exceeded power of the turbine are determined. The starting power for the advance pitch control is determined based on a relationship among the boundary, power, and pitch angle.

In S303, in a case that the rotation speed of the wind turbine reaches the first rated rotation speed and the power of the wind turbine reaches the starting power, the motor torque is increased to maintain the wind turbine at the first rated rotation speed and increase the power of the wind turbine, and the pitch angle is increased based on a first calibrated relationship between the power of the wind turbine and the pitch angle to make the hub thrust of the turbine change by following the limit boundary of hub thrust.

In the case that the rotation speed of the wind turbine reaches the first rated rotation speed and the power of the wind turbine reaches the starting power, the wind turbine is maintained at the first rated rotation speed in order to avoid an excessive rotation speed. In an example, the wind turbine is maintained at the first rated rotation speed by increasing the motor torque. With the increase of the motor torque and the wind turbine being maintained at the first rated rotation speed, the power of the wind turbine is increased. In one or more embodiments, the motor torque is increased through a closed-loop feedback control, so as to maintain the wind turbine at the first rated rotation speed.

The advance pitch control is started in a case that the rotation speed of the wind turbine reaches the first rated rotation speed and the power of the wind turbine reaches the starting power. Here, the first calibrated relationship between the power of the wind turbine and the pitch angle is determined. The pitch angle is obtained based on a current power of the wind turbine and the first calibrated relationship. Then, the pitch angle is increased through a pitch motor to make the hub thrust of the turbine change by following the limit boundary of hub thrust. In this way, a load at the hub center is precisely controlled within a certain range, the extreme load of the turbine is reduced, a design cost of components is reduced, and a service life is improved.

In an implementation, a method for controlling a wind turbine is further provided according to another embodiment of the present disclosure. In addition to S301 to S304, the method further includes obtaining the first calibrated relationship between power and pitch angle of the wind turbine. In an embodiment, a specific implementation of the obtaining the first calibrated relationship between power and pitch angle of the wind turbine is provided, as B1 to B3 described below.

In S304, the pitch angle is increased to maintain the rotation speed of the wind turbine at the first rated rotation speed until a target wind speed is reached, in response to the power of the wind turbine being increased to the exceeded power.

It can be understood that the power reaches the rated power of the wind turbine before reaching the exceeded power. At this time, the motor torque is still controlled to increase the power, so that the power of the wind turbine is increased to the exceeded power.

In response to the power of the wind turbine being increased to the exceeded power, the wind speed is the rated wind speed, that is, V2 in FIG. 5a, FIG. 5b or FIG. 5c. In this case, the wind turbine operates at full capacity with the exceeded power. In addition, the motor torque reaches a first torque. After the power of the wind turbine is increased to the exceeded power, the pitch angle is increased to maintain the rotation speed of the wind turbine at the first rated rotation speed until a target wind speed is reached, and the motor torque is maintained at the first torque. Thereby, as the rotation speed of the wind turbine is maintained at the first rated rotation speed and the motor torque is maintained at the first torque, the power of the wind turbine is maintained at the exceeded power. In one or more embodiments, the process of increasing the pitch angle to maintain the rotation speed of the wind turbine at the first rated rotation speed is performed through a closed-loop feedback control.

As an alternative example, the target wind speed is a cut-out wind speed. In other words, the wind turbine operates at the exceeded power before shut down.

Figure 6A:
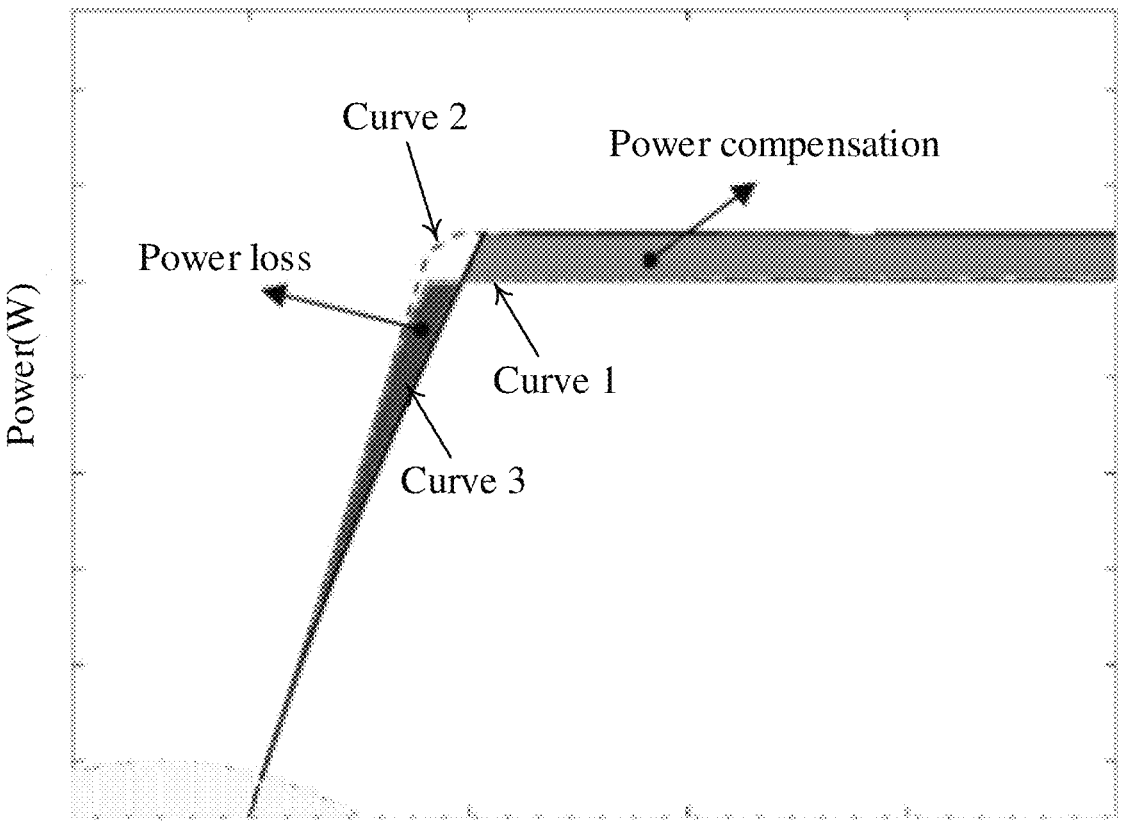
FIG. 6a is a schematic diagram showing a change in a power according to an embodiment of the present disclosure.
Figure 6B:
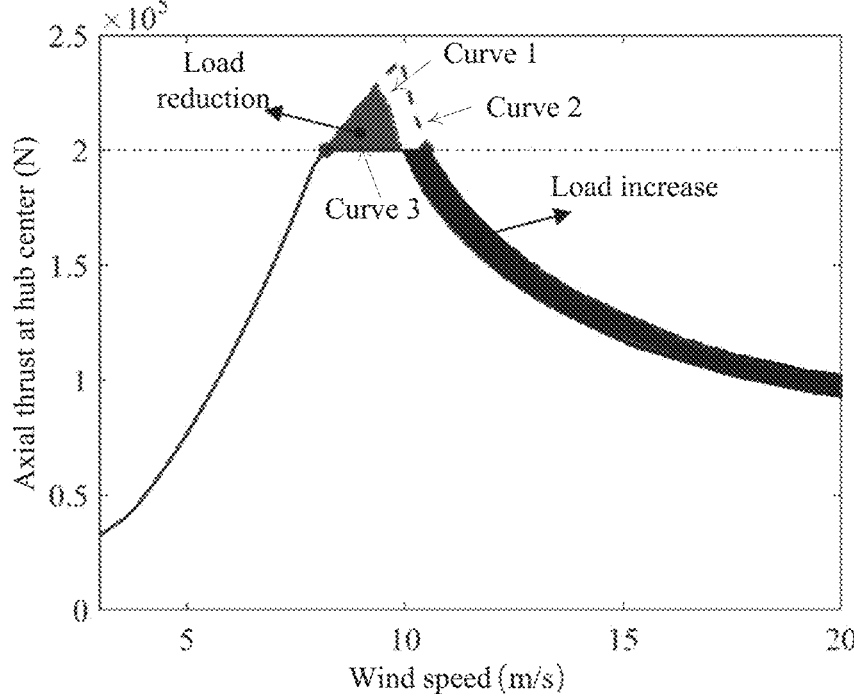
FIG. 6b is a schematic diagram showing a change in a turbine hub thrust according to an embodiment of the present disclosure.
Figure 6C:
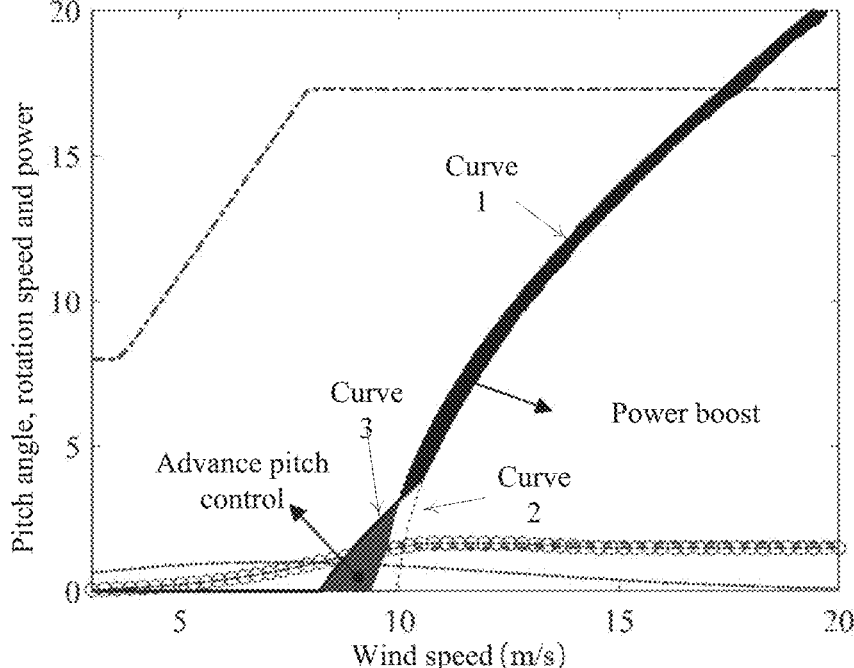
FIG. 6c is a schematic diagram showing a change in a pitch angle according to an embodiment of the present disclosure.

In a case that the target wind speed is the cut-out wind speed, reference is made to FIG. 6a, FIG. 6b and FIG. 6c. FIG. 6a is a schematic diagram showing a change in a power according to an embodiment of the present disclosure. FIG. 6b is a schematic diagram showing a change in a hub thrust of a wind turbine according to an embodiment of the present disclosure. FIG. 6c is a schematic diagram showing a change in a pitch angle according to an embodiment of the present disclosure. FIG. 6a corresponds to FIG. 5a, FIG. 6b corresponds to FIG. 5b, and FIG. 6c corresponds to FIG. 5c. It can be understood that the parameter(s) for controlling the operation of the wind turbine may be obtained from FIG. 5a, FIG. 5b, and FIG. 5c. The power, mapping of hub thrust, and curve of a pitch angle of the wind turbine resulted from the operation of the wind turbine with the parameter(s) are roughly the same as those shown in FIG. 5a, FIG. 5b, and FIG. 5c. FIG. 6a, FIG. 6b, and FIG. 6c are taken as an example to illustrate a result of controlling the wind turbine.

As shown in FIG. 6a, an advance pitch control performed at the rated power results in a power loss. In an embodiment of the present disclosure, after reaching the rated power of the wind turbine, a power boost may be performed on the turbine in order to compensate for the lost power generation and thereby improve an economic benefit created by the wind turbine. As shown in FIG. 6b, in an implementation of the present disclosure, due to the limit boundary of hub thrust, the hub thrust of the turbine can be limited within a certain range through a control on the pitch angle during the advance pitch control (i.e., S303). Thereby, the peak thrust load is reduced and an excessive thrust load during the operation of the turbine is avoided. Although, as shown in FIG. 6b, the hub thrust load of the turbine under a power boost control in a later stage is increased in comparison to that under the conventional control algorithm, the hub thrust of the turbine is still controlled below the limit boundary of hub thrust. As can be seen from FIG. 6c, change of the pitch angle with the wind speed is as shown in curve 3, where the triangle area indicates the advance pitch control, and the long strip area thereafter indicates the power boost control of the wind turbine.

It can be understood that the curve 1 in FIG. 5 and FIG. 6 are both obtained at the rated power.

From the description of S301 to S304, the present disclosure provides a method for controlling a wind turbine, with which a mapping of the wind turbine can be obtained. The starting power for starting an advance pitch control is determined based on the mapping of the wind turbine. The starting power is determined based on the mapping of hub thrust of the wind turbine under an exceeded power, the mapping of turbine power under the exceeded power, and the limit boundary of hub thrust. The exceeded power is greater than the rated power of the wind turbine, and the starting power is less than the rated power of the wind turbine. In a case that the rotation speed of the wind turbine reaches the first rated rotation speed and the power of the wind turbine reaches the starting power, the motor torque is increased to maintain the wind turbine at the first rated rotation speed and increase the power of the wind turbine, and the pitch angle is increased based on a first calibrated relationship between the power of the wind turbine and the pitch angle to make the hub thrust of the turbine change by following the limit boundary of hub thrust. In this way, a peak in the mapping of hub thrust can be eliminated by using the set limit boundary of hub thrust. Further, the pitch angle is increased to maintain the rotation speed of the wind turbine at the first rated rotation speed until the target wind speed is reached, in response to the power of the wind turbine being increased to the exceeded power. The rotation speed of the wind turbine is maintained at the first rated rotation speed and the motor torque is maintained at the first torque after the exceeded power is reached. Therefore, the power of the wind turbine is maintained at the exceeded power. Since the exceeded power is greater than the rated power, by increasing the power of the wind turbine to the exceeded power and maintaining for a period of time until the wind speed reaches the target wind speed, a power loss caused by the advance pitch control is compensated and a loss of power generation is reduced.

In an embodiment, a specific implementation of the obtaining the first calibrated relationship between power and pitch angle of the wind turbine in S303 is provided, including B1 to B3 described below.

In B1, a target interval between the first thrust intersection point and the second thrust intersection point in the limit boundary of hub thrust is obtained, where an abscissa of the target interval represents a wind speed, and an ordinate of the target interval represents a hub thrust of the turbine.

For example, after curve 3 in FIG. 5a, curve 3 in FIG. 5b and curve 3 in FIG. 5c, which are for guiding and controlling an operation of the wind turbine, are obtained based on the blade element momentum theory, the target interval between the first thrust intersection point and the second thrust intersection point is a target segment between point A and point C on curve 4 in FIG. 5b.

In B2, an optimized mapping interval of the power of the wind turbine corresponding to the target interval and an optimized mapping interval of the pitch angle corresponding to the target interval are obtained. The optimized mapping interval of the power of the wind turbine represents a relationship between the wind speed and the power of the wind turbine. The optimized mapping interval of the pitch angle represents a relationship between the wind speed and the pitch angle.

For example, after obtaining curve 3 in FIG. 5a, curve 3 in FIG. 5b, and curve 3 in FIG. 5c for guiding and controlling the operation of the wind turbine based on the blade momentum theory, the optimized mapping interval of the power of the wind turbine corresponding to the target interval is a curve segment between point A and point C in curve 3 in FIG. 5a. The optimized mapping interval of the pitch angle corresponding to the target interval is a curve segment between point A and point C in curve 3 in FIG. 5c.

In B3, a first calibrated relationship between the power of the wind turbine and the pitch angle is obtained based on the optimized mapping interval of the power and the optimized mapping interval of the pitch angle.

After the optimized mapping interval of the power and the optimized mapping interval of the pitch angle are obtained, a relationship between the power and the pitch angle can be obtained from the relationship between the wind speed and the power in the optimized mapping interval of the power and the relationship between the wind speed and the pitch angle in the optimized mapping interval of the pitch angle, and is determined as the first calibrated relationship. As an alternative example, the first calibrated relationship may be recorded in the form of a table. In a practical application, after the power of the wind turbine is obtained, an expected pitch angle may be obtained by looking up the table, and the pitch angle may be adjusted to the expected pitch angle through a pitch motor.

The power in the optimized mapping interval of the power and the pitch angle in the optimized mapping interval of the pitch angle may be regarded as control parameters obtained from curve 3 in FIG. 5a, curve 3 in FIG. 5b, and curve 3 in FIG. 5c.

In addition, a potential burden on components of the wind turbine may be caused by the power boost. Therefore, in order to improve a service life of the component of the wind turbine, the power of the wind turbine may be reduced to the rated power after the power boost lasts for a certain period of time, controlling the wind turbine to operate at the rated power. A node for reducing the exceeded power to the rated power is a target power transition stage.

Hence, a wind speed range corresponding to a stage where the exceeded power is maintained and a wind speed range corresponding to a target power transition stage may be determined in advance and specifically includes C1 to C3 as follows.

In C1, an early wind speed range corresponding to the stage where the exceeded power is maintained and a later wind speed range corresponding to the target power transition stage are obtained.

A wind speed when the power of the wind turbine reaches the exceeded power is a second wind speed, which is represented by V2. The early wind speed range L1 corresponding to the stage where the exceeded power is maintained is equal to a width between the second wind speed V2 and a third wind speed V3, that is, L1=V3−V2. The reducing of the power of the wind turbine starts when the third wind speed is reached. As an alternative example, L1 satisfies L1∈[0.5 m/s, 8 m/s], and preferably ranges from 1 m/s to 3 m/s. Reference may be made to FIG. 4 for L1.

A wind speed when the power of the wind turbine is reduced to the rated power is a fourth wind speed, which is represented by V4. The later wind speed range L2 corresponding to the target power transition stage is equal to a width between the third wind speed V3 and the fourth wind speed V4, that is, L2=V4−V3. As an alternative example, L2 satisfies L2∈[0.5 m/s, 15 m/s], and preferably ranges from 1 m/s to 3 m/s. Reference may be made to FIG. 4 for values of L2.

In one or more embodiments, the early wind speed range and the later wind speed range are pre-set control parameters. The turbine is maintained at the exceeded power when in the early wind speed range. The early wind speed range is set for compensating for the power loss caused by the advance pitch control under the rated power. A greater interval of the early wind speed range corresponds to more power generation compensated for by the exceeded power. The later wind speed range is for allowing the power of wind turbine to smoothly transition from the exceeded power to the rated power. Power compensation is still on-going when in the later wind speed range. In a case of a great wind speed, the wind turbine is controlled to operate at a lower power within the later wind speed range, which is beneficial for load reduction of components such as the blades.

In C2, the third wind speed is obtained based on the second wind speed when the power of the wind turbine is increased to the exceeded power and the early wind speed range corresponding to the stage where the exceeded power is maintained. The power of the wind turbine is the exceeded power in a case of the third wind speed.

After the early wind speed range, the later wind speed range, and the second wind speed are obtained, the third wind speed may be obtained based on the second wind speed and the early wind speed range.

In C3, the fourth wind speed is obtained based on the third wind speed and the later wind speed range corresponding to the target power transition stage. The power of the wind turbine is the rated power in a case of the fourth wind speed.

After the third wind speed is obtained, the fourth wind speed may be obtained based on the third wind speed and the later wind speed range.

In one or more embodiments, during the target power transition stage, the power of the wind turbine is adjusted based on the relationship between the wind speed and the power of the wind turbine. Therefore, the second calibrated relationship between the power of the wind turbine and the wind speed may be obtained in advance in the following manner.

In an example, the second calibrated relationship between the power of the wind turbine and the wind speed may be established based on the third wind speed, the exceeded power corresponding to the third wind speed, the fourth wind speed, and the rated power corresponding to the fourth wind speed.

In practice, the second calibrated relationship between the power of the wind turbine and the wind speed may be linear or nonlinear. That is, the second calibrated relationship may be presented as a slope, or a family of curves fitted by polynomials. As an alternative example, the second calibrated relationship between the power of the wind turbine and the wind speed may be presented in the form of a table, in which correspondence between the power of the wind turbine and the wind speed is recorded. It can be understood that the second calibrated relationship between the power of the wind turbine and the wind speed is not limited in the embodiments of the present disclosure, and may be determined based on an actual need.

Based on the above description, in one or more embodiments, the target wind speed may be equal to the third wind speed. That is, the wind turbine operates under the exceeded power until the third wind speed is reached. In a case that the target wind speed is equal to the third wind speed, an embodiment of the present disclosure includes, in addition to S301 to S304, S701 to S704 as follows.

In S701, in response to the wind speed reaching the third wind speed, the pitch angle is adjusted to maintain the rotation speed of the wind turbine at the first rated rotation speed, a target power corresponding to a real-time wind speed is obtained based on the second calibrated relationship between the power of the wind turbine and the wind speed, and the motor torque is adjusted to control the wind turbine to reach the target power.

When the wind speed reaches the third wind speed, the pitch angle is adjusted to maintain the rotation speed of the wind turbine at the first rated rotation speed. In one or more embodiments, the process of adjusting the pitch angle to maintain the rotation speed of the wind turbine at the first rated rotation speed is performed through a closed-loop feedback control. The rotation speed of the wind turbine is inputted to a closed-loop adjustment system, in which the rotation speed is compared with the first rated rotation speed to obtain a difference there between. Then, the pitch motor is controlled based on the difference to adjust the pitch angle, so as to maintain the rotation speed of the wind turbine at the first rated rotation speed and eliminate a deviation of the rotation speed.

In addition, a target power corresponding to a real-time wind speed is obtained based on the second calibrated relationship between the power of the wind turbine and the wind speed, and the motor torque is adjusted to control the wind turbine to reach the target power. The power of the wind turbine is reduced during the target power transition stage. The real-time wind speed refers to a current wind speed collected in real time after the third wind speed is reached.

In order to obtain a more accurate real-time wind speed and reduce the number of power adjustments, a wind speed during a second preset time period may be monitored at a first preset time interval, and an average wind speed in the second preset time period may be calculated. The wind speed during the second preset time period may be determined as a wind speed for adjustment. For example, the first preset time period is 1 minute, and the second preset time interval is in a range from 30 seconds to 2 minutes, such as 50 seconds. That is, the power is adjusted every 1 minute, and a wind speed is monitored for 50 seconds as the 1-minute interval ends. An average wind speed during the 50 seconds is obtained and applied as the wind speed for adjustment. In addition, a target power corresponding to the wind speed for adjustment is obtained based on the second calibrated relationship between the power of the wind turbine and the wind speed, and the motor torque is adjusted to control the wind turbine to reach the target power.

It is determined whether to adjust the rotation speed of the wind turbine when the power of the wind turbine is reduced to the rated power and the fourth wind speed is reached. If it is determined to adjust the rotation speed of the wind turbine, the rotation speed of the wind turbine may be reduced so as to improve service life of components of the wind turbine. Hence, there is a situation including S702 to S703 and a situation of S704.

In S702, when the power of the wind turbine is reduced to the rated power and the fourth wind speed is reached, the second rated rotation speed is obtained and a second torque is determined based on a relationship between (for example, a quotient of) the rated power and the second rated rotation speed.

The second rated rotation speed is obtained in response to determining to adjust the rotation speed of the wind turbine.

The second rated rotation speed is less than the first rated rotation speed. The rated rotation speed of the wind turbine is reduced from the first rated rotation speed to the second rated rotation speed, so that service life of components of the wind turbine is increased.

As an alternative example, a ratio of the first rated rotation speed to the second rated rotation speed is in a range of [1,1.1].

In S703, the rotation speed of the wind turbine is changed from the first rated rotation speed to the second rated rotation speed, the motor torque is adjusted to the second torque, the pitch angle is increased to maintain the rotation speed of the wind turbine at the second rated rotation speed. Hence, as the rotation speed of the wind turbine is maintained at the second rated rotation speed and the motor torque is maintained at the second torque, the power of the wind turbine is maintained at the rated power.

After the rotation speed of the wind turbine is adjusted and the second rated rotation speed after adjustment is obtained, as the power of the wind turbine is reduced to the rated power and the fourth wind speed is reached, the rotation speed of the wind turbine is changed from the first rated rotation speed to the second rated rotation speed, and the motor torque is adjusted to the second torque and maintained at the second torque. The second torque may be equal to a quotient of the rated power to the second rated rotation speed.

In addition, the pitch angle is increased to maintain the rotation speed of the wind turbine at the second rated rotation speed. Thereby, as the rotation speed of the wind turbine is maintained at the second rated rotation speed and the motor torque is maintained at the second torque, the power of the wind turbine is maintained at the rated power.

In one or more embodiments, the process of adjusting the pitch angle to maintain the rotation speed of the wind turbine at the second rated rotation speed is performed through a closed-loop feedback control.

It can be understood that, by reducing the power from the exceeded power to the rated power and reducing from the first rated rotation speed to the second rated rotation speed, a fatigue load of the turbine under a high wind speed can be effectively reduced, an inverter can be protected, and component reliability can be improved.

In S704, when the power of the wind turbine is reduced to the rated power and the fourth wind speed is reached, the motor torque reaches a third torque, the pitch angle is increased to maintain the rotation speed of the wind turbine at the first rated rotation speed. Hence, as the rotation speed of the wind turbine is maintained at the first rated rotation speed and the motor torque is maintained at the third torque, the power of the wind turbine is maintained at the rated power.

In response to determining not to adjust the rotation speed of the wind turbine, the motor torque reaches the third torque as the power of the wind turbine is reduced to the rated power and the fourth wind speed is reached. In this case, the pitch angle is increased to maintain the rotation speed of the wind turbine at the first rated rotation speed. In one or more embodiments, the process of adjusting the pitch angle to maintain the rotation speed of the wind turbine at the first rated rotation speed is performed through a closed-loop feedback control. Thereby, as the rotation speed of the wind turbine is maintained at the first rated rotation speed and the motor torque is maintained at the third torque, the power of the wind turbine is maintained at the rated power.

It can be understood that the solution of S702 to S703 and the solution of S704 are parallel solutions for controlling the wind power in a case that the power of the wind turbine is reduced to the rated power and the fourth wind speed is reached.

Figure 8A:
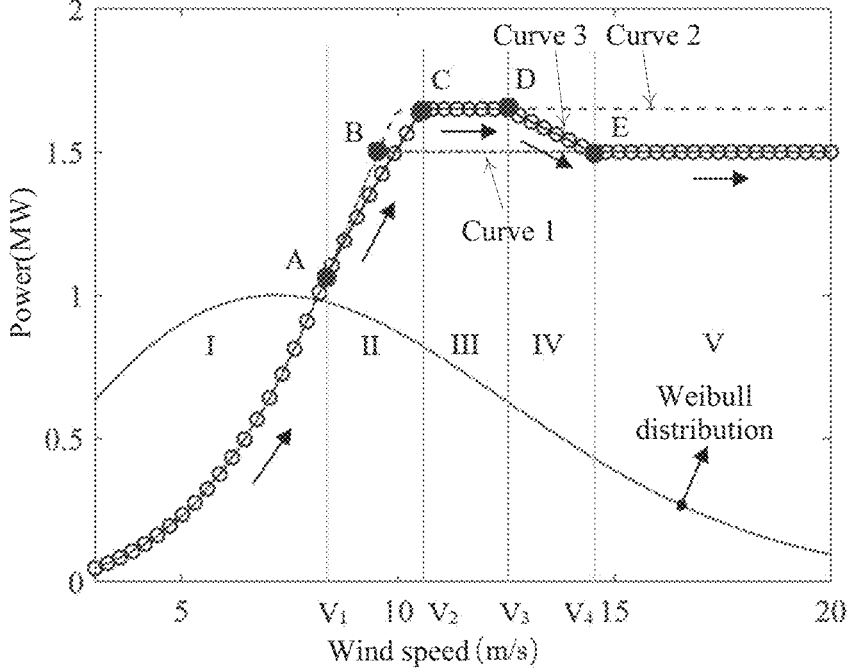
FIG. 8a is a schematic graph showing a curve of a power of a wind turbine according to another embodiment of the present disclosure.
Figure 8B:
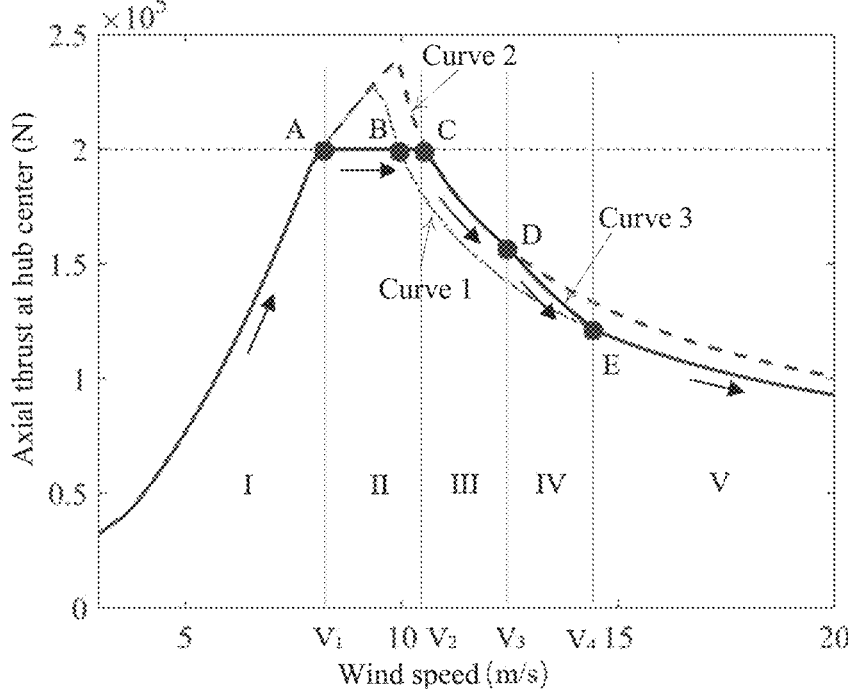
FIG. 8b is a schematic graph showing a curve of a turbine hub thrust according to another embodiment of the present disclosure.
Figure 8C:
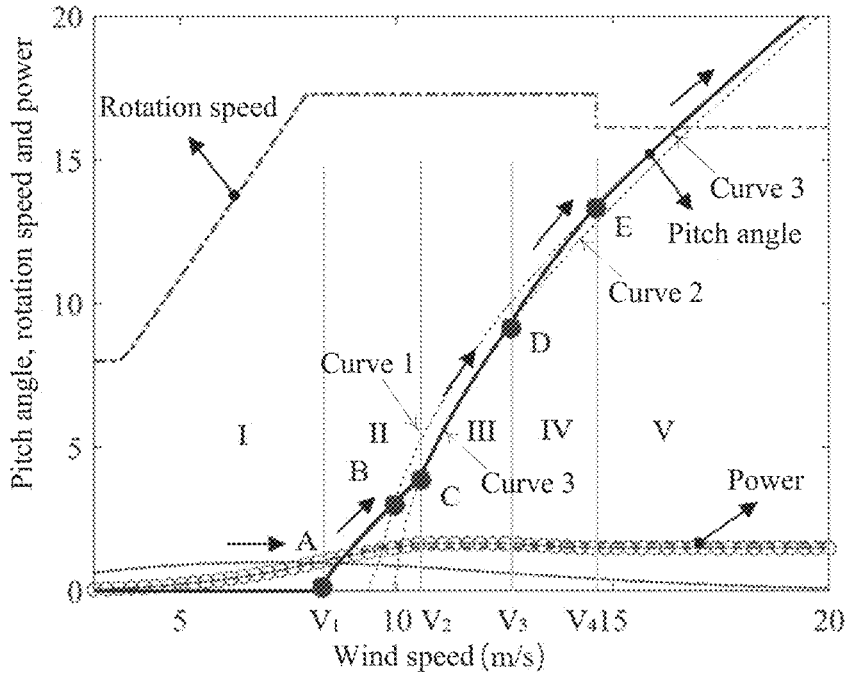
FIG. 8c is a schematic graph showing a curve of a pitch angle and a curve of a rotation speed according to another embodiment of the present disclosure.

Based on the above, reference is made to FIG. 8a, FIG. 8b and FIG. 8c for a situation where the target wind speed is the third wind speed. FIG. 8a is a schematic graph showing a curve of a power of a wind turbine according to another embodiment of the present disclosure. FIG. 8b is a schematic graph showing a curve of a hub thrust of a wind turbine according to another embodiment of the present disclosure. FIG. 8c is a schematic graph showing a curve of a pitch angle and a curve of a rotation speed according to another embodiment of the present disclosure. Curves 3 in FIG. 8a, FIG. 8b and FIG. 8c may be used for guiding and controlling the operation of the wind turbine. In practice, the curve of a power, the mapping of hub thrust, and the curve of a pitch angle of the wind turbine are similar to FIG. 8a, FIG. 8b, and FIG. 8c.

As shown in curve 3 of FIG. 8a, FIG. 8b, and FIG. 8c, a range between a wind speed corresponding to point C and a wind speed corresponding to point D is an early wind speed range, and a range between the wind speed corresponding to point D and a wind speed corresponding to point E is a later wind speed range. In curve 3 of FIG. 8a, a power between point C and point D is an exceeded power, an interval between point D and point E indicates a power reduction stage, and a power corresponding to point E is a rated power. After point E, the wind turbine operates at the rated power until the cut-out wind speed is reached. FIG. 8c shows a situation of reducing from the first rated rotation speed to the second rated rotation speed at point E (i.e., when the fourth wind speed is reached). In a practical application, as described in S704, it is also possible to maintain the first rated rotation speed under the fourth wind speed. In this case, the torque at this time may be equal to a quotient of the rated power to the first rated rotation speed. In one or more embodiments, in FIG. 5c, the wind turbine is maintained at the first rated rotation speed during the stage where the exceeded power is maintained, without reducing the first rated rotation speed.

In one or more embodiments, the regions I, II, III, IV, and V in the drawings correspond to a control stage before S302 and after S303 where the starting power is not reached, a control stage in S303, a control stage in S304 where the target wind speed is the third wind speed, a control stage in S701, and a control stage in S702 to S703, respectively. Region V may further correspond to a control stage in S704.

Figure 9A:
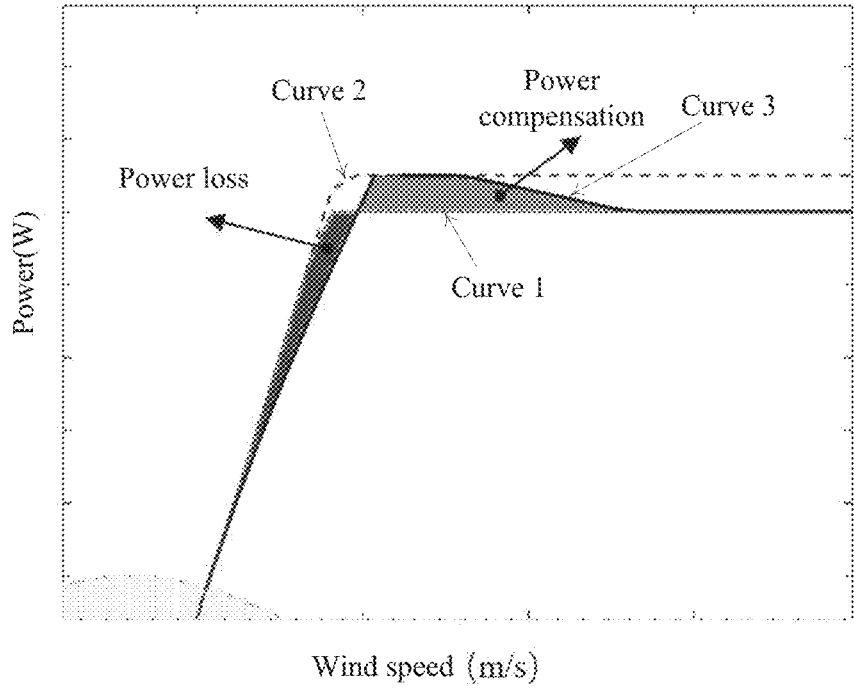
FIG. 9a is a schematic diagram showing a change in a power according to another embodiment of the present disclosure.
Figure 9B:
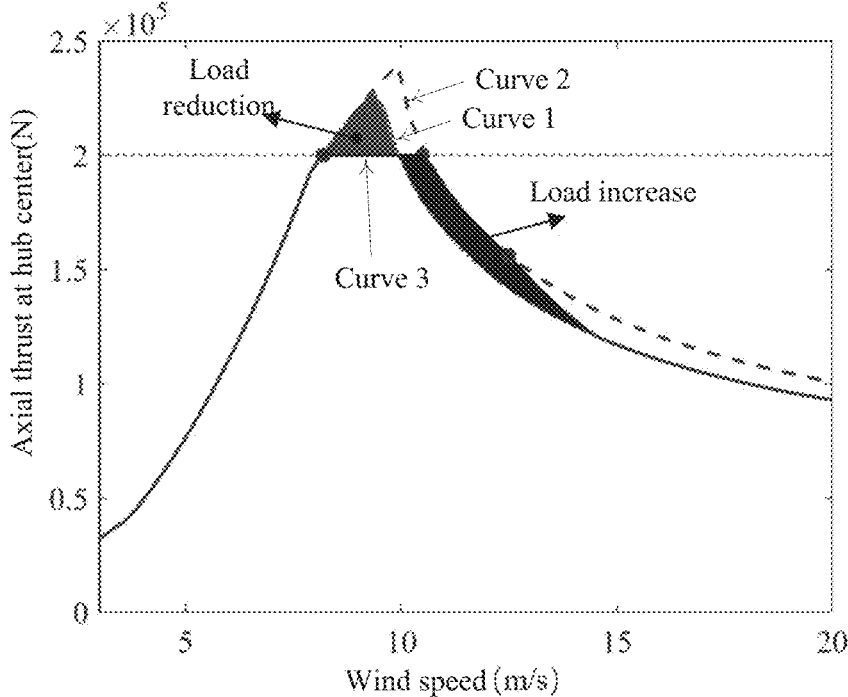
FIG. 9b is a schematic diagram showing a change in a turbine hub thrust according to another embodiment of the present disclosure.
Figure 9C:
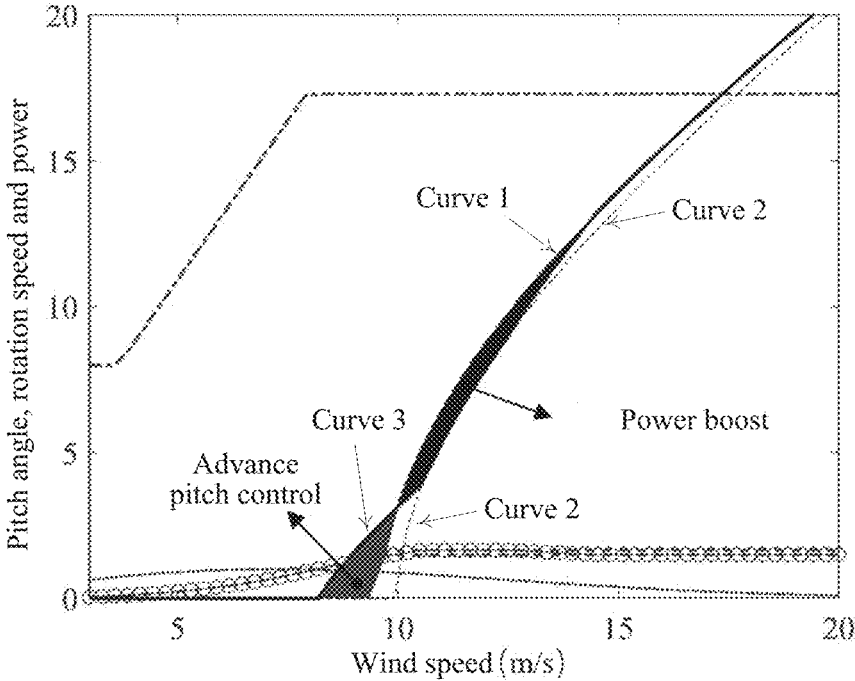
FIG. 9c is a schematic diagram showing a change in a pitch angle according to another embodiment of the present disclosure.

Reference is made to FIG. 9a, FIG. 9b and FIG. 9c. FIG. 9a is a schematic diagram showing a change in a power according to another embodiment of the present disclosure. FIG. 9b is a schematic diagram showing a change in a hub thrust of a wind turbine according to another embodiment of the present disclosure. FIG. 9c is a schematic diagram showing a change in a pitch angle according to another embodiment of the present disclosure. FIG. 9a, FIG. 9b and FIG. 9c correspond to FIG. 8a, FIG. 8b, and FIG. 8c, respectively.

As shown in FIG. 9a, an advance pitch control performed at a rated power results in a power loss. In an embodiment of the present disclosure, after reaching the rated power of the wind turbine, a power boost may be performed on the turbine in order to compensate for the lost power generation and thereby improve an economic benefit created by the wind turbine. As shown in FIG. 9b, in an implementation of the present disclosure, due to the limit boundary of hub thrust, the hub thrust of the turbine can be limited within a certain range through a control of the pitch angle during the advance pitch control (i.e., S303). Thereby, the peak thrust load is reduced and an excessive thrust load during the operation of the turbine is avoided. Although the axial thrust load at a hub center of the turbine under a power boost control in a later stage is increased in comparison to that under the conventional control algorithm, the hub thrust of the turbine is still controlled below the limit boundary of hub thrust. From FIG. 9c, a curve of the pitch angle changing with a wind speed is shown by curve 3. In FIG. 9c, the triangle area indicates the advance pitch control, and the long strip area thereafter indicates the power boost control of the wind turbine.

Curves 1 in FIG. 8 and FIG. 9 may be both obtained at the rated power.

In a case where the target wind speed is the third wind speed (that is, in a case of reducing the exceeded power to the rated power), the magnitude of power compensation of the wind turbine depends on positions of point C, point D and point E in FIG. 8a, that is, depends on an overall width of the early wind speed range and the later wind speed range. In a case that a horizontal distance between point D and point E is small (i.e., the later wind speed range is small), a range of wind speed for power boost is determined based on point C and point D.

From the contents in S701 to S704, a peak in the mapping of hub thrust can be eliminated by setting limit boundary of hub thrust. Since a wind speed range exists for the exceeded power and the exceeded power is greater than the rated power, by increasing the power of the wind turbine to the exceeded power and maintaining for a period of time until the wind speed reaches the third wind speed, a power loss caused by the advance pitch control at the rated power can be compensated. In addition, the power of the wind turbine is reduced when the third wind speed is reached, so that service life of components of the wind turbine can be improved. In a case that the rotation speed of the wind turbine is reduced under the fourth wind speed, the service life of components of the wind turbine can be further improved.

Based on the method provided in the above method embodiments, an apparatus for controlling a wind turbine is further provided in an embodiment of the present disclosure. The apparatus is described below in conjunction with the drawings. Technical details of the apparatus may be referred to the above method embodiments.

Figure 10:
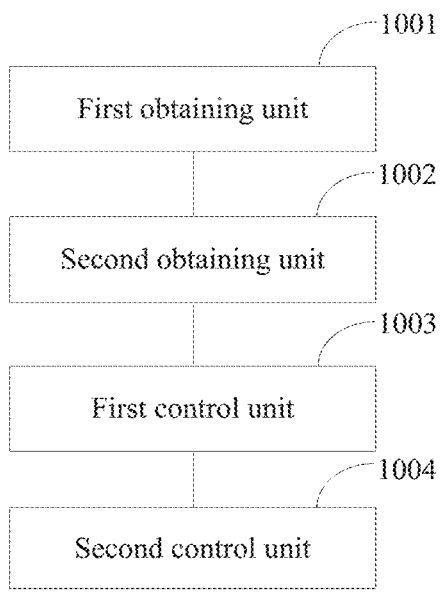
FIG. 10 is a schematic structural diagram of an apparatus for controlling a wind turbine according to an embodiment of the present disclosure.

Reference is made to FIG. 10, which is a schematic structural diagram of an apparatus for controlling a wind turbine according to an embodiment of the present disclosure. As shown in FIG. 10, the apparatus includes a first obtaining unit 1001, a second obtaining unit 1002, a first control unit 1003 and a second control unit 1004.

The first obtaining unit 1001 is configured to obtain a mapping of the wind turbine, where the mapping of the wind turbine includes a mapping of hub thrust under an exceeded power, a mapping of turbine power under the exceeded power, and a limit boundary of hub thrust.

The second obtaining unit 1002 is configured to determine a starting power for starting an advance pitch control based on the mapping of the wind turbine.

The first control unit 1003 is configured to: in response to a rotation speed of the wind turbine reaching a first rated rotation speed and a power of the wind turbine reaching the starting power, increase a motor torque to maintain the wind turbine at the first rated rotation speed and increase the power of the wind turbine, and increase a pitch angle based on a first calibrated relationship between the power of the wind turbine and the pitch angle to make the hub thrust of the turbine change by following the limit boundary of hub thrust.

The second control unit 1004 is configured to increase the pitch angle to maintain the rotation speed of the wind turbine at the first rated rotation speed until a target wind speed is reached, in response to the power of the wind turbine being increased to the exceeded power.

In an embodiment, the apparatus further includes an adjustment unit.

The adjustment unit is configured to adjust the motor torque in response to the power of the wind turbine being less than the starting power, to increase the rotation speed of the wind turbine and increase the power of the wind turbine, after the starting power for starting the advance pitch control is obtained based on the mapping of the wind turbine and before the rotation speed of the wind turbine reaches the first rated rotation speed and the power of the wind turbine reaches the starting power.

In an embodiment, the second obtaining unit 1002 includes a first obtaining subunit and a determination subunit.

The first obtaining subunit is configured to obtain a first thrust intersection point and a second thrust intersection point where the mapping of hub thrust under the exceeded power intersects the limit boundary of hub thrust, a first wind speed corresponding to the first thrust intersection point, and a second wind speed corresponding to the second thrust intersection point, where the first wind speed corresponding to the first thrust intersection point is less than the second wind speed corresponding to the second thrust intersection point.

The determination subunit is configured to determine, based on the first wind speed, the starting power corresponding to the first wind speed in the mapping of turbine power under an exceeded power, where the starting power indicates a power at which an advance pitch control is started.

In an embodiment, the apparatus further includes a third obtaining unit.

The third obtaining unit is configured to obtain the first calibrated relationship between the power of the wind turbine and the pitch angle.

The third obtaining unit includes a second obtaining subunit, a third obtaining subunit and a fourth obtaining subunit.

The second obtaining subunit is configured to obtain a target interval between the first thrust intersection point and the second thrust intersection point in the limit boundary of hub thrust, where an abscissa of the target interval represents a wind speed, and an ordinate of the target interval represents a hub thrust of the turbine.

The third obtaining subunit is configured to obtain an optimized mapping interval of the power of the wind turbine corresponding to the target interval and an optimized mapping interval of the pitch angle corresponding to the target interval, where the optimized mapping interval of the power of the wind turbine represents a relationship between the wind speed and the power of the wind turbine, and the optimized mapping interval of the pitch angle represents a relationship between the wind speed and the pitch angle.

The fourth obtaining subunit is configured to obtain the first calibrated relationship between the power of the wind turbine and the pitch angle based on the optimized mapping interval of the power and the optimized mapping interval of the pitch angle.

In an embodiment, the target wind speed is a cut-out wind speed.

In an embodiment, the apparatus further includes a fourth obtaining unit, a fifth obtaining unit and a sixth obtaining unit.

The fourth obtaining unit is configured to obtain an early wind speed range corresponding to a stage where the exceeded power is maintained and a later wind speed range corresponding to a target power transition stage.

The fifth obtaining unit is configured to obtain a third wind speed based on the second wind speed when the power of the wind turbine is increased to the exceeded power and the early wind speed range corresponding to the stage where the exceeded power is maintained, where the power of the wind turbine is the exceeded power in a case of the third wind speed.

The sixth obtaining unit is configured to obtain a fourth wind speed based on the third wind speed and the later wind speed range corresponding to the target power transition stage, where the power of the wind turbine is the rated power in a case of the fourth wind speed.

In an embodiment, the apparatus further includes an establishing unit.

The establishing unit is configured to establish a second calibrated relationship between the power of the wind turbine and the wind speed based on the third wind speed, the exceeded power corresponding to the third wind speed, the fourth wind speed, and the rated power corresponding to the fourth wind speed.

In an embodiment, the target wind speed is the third wind speed, and the apparatus further includes an adjustment unit.

The adjustment unit is configured to: in response to the wind speed reaching the third wind speed, adjust the pitch angle to maintain the rotation speed of the wind turbine at the first rated rotation speed, obtain a target power corresponding to a real-time wind speed based on the second calibrated relationship between the power of the wind turbine and the wind speed, and adjust the motor torque to control the wind turbine to reach the target power.

In an embodiment, the apparatus further includes a seventh obtaining unit and a changing unit.

The seventh obtaining unit is configured to: in response to the power of the wind turbine being reduced to the rated power and the wind speed reaching the fourth wind speed, obtain the second rated rotation speed, and determine a second torque based on a relationship between the rated power and the second rated rotation speed.

The changing unit is configured to change the rotation speed of the wind turbine from the first rated rotation speed to the second rated rotation speed, adjust the motor torque to the second torque, and increase the pitch angle to maintain the rotation speed of the wind turbine at the second rated rotation speed. As the rotation speed of the wind turbine is maintained at the second rated rotation speed and the motor torque is maintained at the second torque, the power of the wind turbine is maintained at the rated power.

In an embodiment, the apparatus further includes a third control unit.

The third control unit is configured to increase the pitch angle to maintain the rotation speed of the wind turbine at the first rated rotation speed in response to the power of the wind turbine being reduced to the rated power and the wind speed reaching the fourth wind speed and the motor torque reaches a third torque. As the rotation speed of the wind turbine is maintained at the first rated rotation speed and the motor torque is maintained at the third torque, the power of the wind turbine is maintained at the rated power.

A computer-readable storage medium storing a computer program is further provided according to an embodiment of the present disclosure. The computer program, when executed by a processor, performs the method according to any of the above embodiments.

Figure 11:
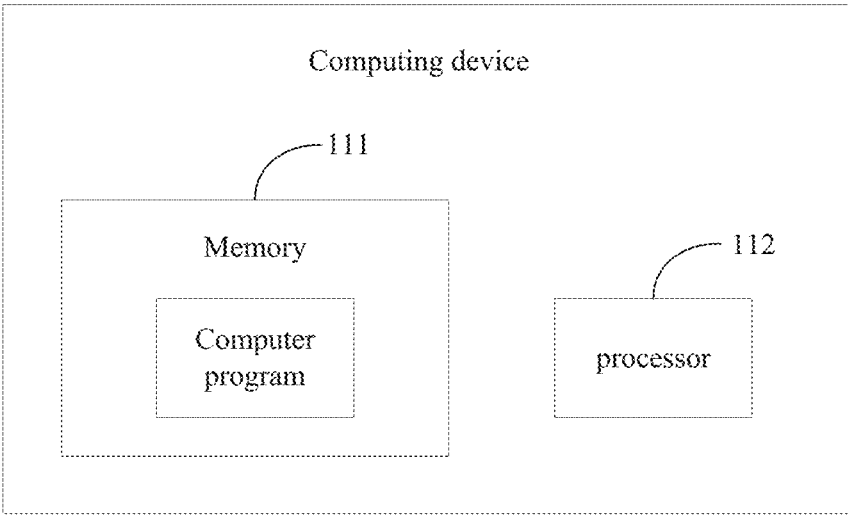
FIG. 11 is a schematic diagram of a computing device according to an embodiment of the present disclosure.

Reference is made to FIG. 11, which is a block diagram of a computing device according to an embodiment of the present disclosure.

Referring to FIG. 11, a computing device according to an embodiment of the present disclosure includes a memory 111 and a processor 112. The memory 111 stores a computer program. The computer program, when executed by the processor 112, performs the method for controlling a wind turbine according to any of the embodiments of the present disclosure.

In an exemplary embodiment of the present disclosure, when the computer program is executed by the processor 112, the following steps can be implemented.

The steps include: obtaining a mapping of the wind turbine, where the mapping of the wind turbine includes a mapping of hub thrust under an exceeded power, a mapping of turbine power under an exceeded power, and a limit boundary of hub thrust; determining a starting power for starting an advance pitch control based on the mapping of the wind turbine; in response to a rotation speed of the wind turbine reaching a first rated rotation speed and a power of the wind turbine reaching the starting power, increasing a motor torque to maintain the wind turbine at the first rated rotation speed and increase the power of the wind turbine, and increasing a pitch angle based on a first calibrated relationship between the power of the wind turbine and the pitch angle to make the hub thrust of the turbine change by following the limit boundary of hub thrust; and increasing the pitch angle to maintain the rotation speed of the wind turbine at the first rated rotation speed until a target wind speed is reached, in response to the power of the wind turbine being increased to the exceeded power.

From the description of the above embodiments, those skilled in the art can clearly understand that all or part of the steps in the method according to the embodiments can be implemented by means of software and a necessary general hardware platform. Based on such understanding, the technical solutions of the embodiments of the present disclosure, essentially or in part, contribute to the conventional technology may be embodied in a form of a software product. The computer software product may be stored in a storage medium, such as an ROM/RAM, a magnetic disk and an optical disk, and includes instructions for causing a computer device (which may be a personal computer, a server, a network communication device like a media gateway, and the like) to perform the method described in the embodiments, or a certain part of the embodiments, of the present disclosure.

The embodiments in the present disclosure are described in a progressive manner, and each of the embodiments focuses on its differences from the other embodiments. The same or similar parts among the embodiments may be referred to each other. The method disclosed in the embodiments corresponds to the system disclosed in the embodiments, and therefore is described in a relatively simple manner. Reference may be made to the description of the system for relevant details of the method.

In one or more embodiments of the present disclosure, terms of "include", "comprise" or any other variants are intended to be non-exclusive. Therefore, a process, method, article or device including a series of elements includes not only the elements but also other elements that are not enumerated, or further includes the elements inherent for the process, method, article or device. Unless expressively limited otherwise, the statement "comprising (including) one . . . " does not exclude existence of other similar elements in the process, method, article or device.

The above description of the disclosed embodiments enables those skilled in the art to implement or use the present disclosure. Various modifications to the embodiments are apparent to those skilled in the art, and the generic principles defined herein may be practiced in other embodiments without departing from the spirit or scope of the present disclosure. Therefore, the present disclosure is not to be limited to the embodiments shown herein but is to be conformed with the widest scope consistent with the principles and novel features disclosed herein.

The invention claimed is:

1. A method for controlling a wind turbine, comprising:
   obtaining a mapping of the wind turbine, wherein the mapping of the wind turbine comprises a mapping of hub thrust under an exceeded power, a mapping of turbine power under the exceeded power, and a limit boundary of hub thrust;
   determining a starting power for starting an advance pitch control based on the mapping of the wind turbine;
   in response to a rotation speed of the wind turbine reaching a first rated rotation speed and a power of the wind turbine reaching the starting power,
   increasing a motor torque to maintain the wind turbine at the first rated rotation speed and increase the power of the wind turbine, and
   increasing a pitch angle based on a first calibrated relationship between the power of the wind turbine and the pitch angle, to make the hub thrust of the turbine change by following the limit boundary of hub thrust; and
   increasing the pitch angle to maintain the rotation speed of the wind turbine at the first rated rotation speed until a target wind speed is reached, in response to the power of the wind turbine being increased to the exceeded power.

2. The method according to claim 1, wherein after determining the starting power for starting the advance pitch control based on the mapping of the wind turbine and before the rotation speed of the wind turbine reaches a first rated rotation speed and the power of the wind turbine reaches the starting power, the method further comprises:
   adjusting the motor torque to increase the rotation speed of the wind turbine and increase the power of the wind turbine, in response to the power of the wind turbine being less than the starting power.

3. The method according to claim 1, wherein the determining the starting power for starting the advance pitch control based on the mapping of the wind turbine comprises:
   obtaining a first thrust intersection point and a second thrust intersection point where the mapping of hub thrust under the exceeded power intersects the limit boundary of hub thrust, a first wind speed corresponding to the first thrust intersection point, and a second wind speed corresponding to the second thrust intersection point, wherein the first wind speed corresponding to the first thrust intersection point is less than the second wind speed corresponding to the second thrust intersection point; and
   determining, based on the first wind speed, the starting power corresponding to the first wind speed in the mapping of turbine power under the exceeded power, wherein the starting power indicates a power at which an advance pitch control is started.

4. The method according to claim 3, further comprising:

obtaining a target interval between the first thrust intersection point and the second thrust intersection point in the limit boundary of hub thrust, wherein an abscissa of the target interval represents a wind speed, and an ordinate of the target interval represents a hub thrust of the wind turbine;

obtaining an optimized mapping interval of the power of the wind turbine corresponding to the target interval and an optimized mapping interval of the pitch angle corresponding to the target interval, wherein the optimized mapping interval of the power of the wind turbine represents a relationship between the wind speed and the power of the wind turbine, and the optimized mapping interval of the pitch angle represents a relationship between the wind speed and the pitch angle; and obtaining the first calibrated relationship between the power of the wind turbine and the pitch angle based on the optimized mapping interval of the power and the optimized mapping interval of the pitch angle.

5. The method according to claim 1, wherein the target wind speed is a cut-out wind speed.

6. The method according to claim 1, further comprising:

obtaining an early wind speed range corresponding to a stage where the exceeded power is maintained and a later wind speed range corresponding to a target power transition stage;

obtaining a third wind speed based on a second wind speed when the power of the wind turbine is increased to the exceeded power and the early wind speed range corresponding to the stage where the exceeded power is maintained, wherein the power of the wind turbine is equal to the exceeded power in a case of the third wind speed; and obtaining a fourth wind speed based on the third wind speed and the later wind speed range corresponding to the target power transition stage, wherein the power of the wind turbine is equal to the rated power in a case of the fourth wind speed.

7. The method according to claim 6, further comprising:

establishing a second calibrated relationship between the power of the wind turbine and the wind speed based on the third wind speed, the exceeded power corresponding to the third wind speed, the fourth wind speed, and the rated power corresponding to the fourth wind speed.

8. The method according to claim 6, wherein in response to the target wind speed being the third wind speed, the method further comprises:

in response to the wind speed reaching the third wind speed, adjusting the pitch angle to maintain the rotation speed of the wind turbine at the first rated rotation speed, obtaining a target power corresponding to a real-time wind speed based on the second calibrated relationship between the power of the wind turbine and the wind speed, and adjusting the motor torque to control the wind turbine to reach the target power.

9. The method according to claim 8, further comprising:

in response to the power of the wind turbine being reduced to the rated power and the wind speed reaching the fourth wind speed, obtaining a second rated rotation speed and determining a second torque based on a relationship between the rated power and the second rated rotation speed; and adjusting the rotation speed of the wind turbine from the first rated rotation speed to the second rated rotation speed, adjusting the motor torque to the second torque, and increasing the pitch angle to maintain the rotation speed of the wind turbine at the second rated rotation speed, wherein as the rotation speed of the wind turbine is maintained at the second rated rotation speed and the motor torque is maintained at the second torque, the power of the wind turbine is maintained at the rated power.

10. The method according to claim 8, further comprising:

increasing the pitch angle to maintain the rotation speed of the wind turbine at the first rated rotation speed in response to the power of the wind turbine being reduced to the rated power and the wind speed reaching the fourth wind speed and the motor torque reaching a third torque, wherein as the rotation speed of the wind turbine is maintained at the first rated rotation speed and the motor torque is maintained at the third torque, the power of the wind turbine is maintained at the rated power.

11. A computer-readable storage medium storing a computer program, wherein the computer program, when executed by a processor, implements:

obtaining a mapping of the wind turbine, wherein the mapping of the wind turbine comprises a mapping of hub thrust under an exceeded power, a mapping of turbine power under the exceeded power, and a limit boundary of hub thrust;

determining a starting power for starting an advance pitch control based on the mapping of the wind turbine;

in response to a rotation speed of the wind turbine reaching a first rated rotation speed and a power of the wind turbine reaching the starting power, increasing a motor torque to maintain the wind turbine at the first rated rotation speed and increase the power of the wind turbine, and increasing a pitch angle based on a first calibrated relationship between the power of the wind turbine and the pitch angle, to make the hub thrust of the turbine change by following the limit boundary of hub thrust; and increasing the pitch angle to maintain the rotation speed of the wind turbine at the first rated rotation speed until a target wind speed is reached, in response to the power of the wind turbine being increased to the exceeded power.

12. A device for controlling a wind turbine, comprising:

at least one processor; and at least one memory storing a computer program, wherein the computer program, when executed by the at least one processor, implements:

obtaining a mapping of the wind turbine, wherein the mapping of the wind turbine comprises a mapping of hub thrust under an exceeded power, a mapping of turbine power under the exceeded power, and a limit boundary of hub thrust;

determining a starting power for starting an advance pitch control based on the mapping of the wind turbine;

in response to a rotation speed of the wind turbine reaching a first rated rotation speed and a power of the wind turbine reaching the starting power, increasing a motor torque to maintain the wind turbine at the first rated rotation speed and increase the power of the wind turbine, and increasing a pitch angle based on a first calibrated relationship between the power of the wind turbine and the pitch angle, to make the hub thrust of the turbine change by following the limit boundary of hub thrust; and increasing the pitch angle to maintain the rotation speed of the wind turbine at the first rated rotation speed until a target wind speed is reached, in response to the power of the wind turbine being increased to the exceeded power.

13. The device according to claim 12, wherein after determining the starting power for starting the advance pitch control based on the mapping of the wind turbine and before the rotation speed of the wind turbine reaches a first rated rotation speed and the power of the wind turbine reaches the starting power, the at least one processor further implements:

adjusting the motor torque to increase the rotation speed of the wind turbine and increase the power of the wind turbine, in response to the power of the wind turbine being less than the starting power.

14. The device according to claim 12, wherein the at least one processor further implements:

obtaining a first thrust intersection point and a second thrust intersection point where the mapping of hub thrust under the exceeded power intersects the limit boundary of hub thrust, a first wind speed corresponding to the first thrust intersection point, and a second wind speed corresponding to the second thrust intersection point, wherein the first wind speed corresponding to the first thrust intersection point is less than the second wind speed corresponding to the second thrust intersection point; and determining, based on the first wind speed, the starting power corresponding to the first wind speed in the mapping of turbine power under the exceeded power, wherein the starting power indicates a power at which an advance pitch control is started.

15. The device according to claim 14, wherein the at least one processor further implements:

obtaining a target interval between the first thrust intersection point and the second thrust intersection point in the limit boundary of hub thrust, wherein an abscissa of the target interval represents a wind speed, and an ordinate of the target interval represents a hub thrust of the wind turbine;

obtaining an optimized mapping interval of the power of the wind turbine corresponding to the target interval and an optimized mapping interval of the pitch angle corresponding to the target interval, wherein the optimized mapping interval of the power of the wind turbine represents a relationship between the wind speed and the power of the wind turbine, and the optimized mapping interval of the pitch angle represents a relationship between the wind speed and the pitch angle; and obtaining the first calibrated relationship between the power of the wind turbine and the pitch angle based on the optimized mapping interval of the power and the optimized mapping interval of the pitch angle.

16. The device according to claim 12, wherein the target wind speed is a cut-out wind speed.

17. The device according to claim 12, wherein the at least one processor further implements:

obtaining an early wind speed range corresponding to a stage where the exceeded power is maintained and a later wind speed range corresponding to a target power transition stage;

obtaining a third wind speed based on a second wind speed when the power of the wind turbine is increased to the exceeded power and the early wind speed range corresponding to the stage where the exceeded power is maintained, wherein the power of the wind turbine is equal to the exceeded power in a case of the third wind speed; and obtaining a fourth wind speed based on the third wind speed and the later wind speed range corresponding to the target power transition stage, wherein the power of the wind turbine is equal to the rated power in a case of the fourth wind speed.

18. The device according to claim 17, wherein the at least one processor further implements:

establishing a second calibrated relationship between the power of the wind turbine and the wind speed based on the third wind speed, the exceeded power corresponding to the third wind speed, the fourth wind speed, and the rated power corresponding to the fourth wind speed.

19. The device according to claim 17, wherein in response to the target wind speed being the third wind speed, the at least one processor further implements:

in response to the wind speed reaching the third wind speed, adjusting the pitch angle to maintain the rotation speed of the wind turbine at the first rated rotation speed, obtaining a target power corresponding to a real-time wind speed based on the second calibrated relationship between the power of the wind turbine and the wind speed, and adjusting the motor torque to control the wind turbine to reach the target power.

20. The device according to claim 19, wherein the at least one processor further implements:

in response to the power of the wind turbine being reduced to the rated power and the wind speed reaching the fourth wind speed, obtaining a second rated rotation speed and determining a second torque based on a relationship between the rated power and the second rated rotation speed; and adjusting the rotation speed of the wind turbine from the first rated rotation speed to the second rated rotation speed, adjusting the motor torque to the second torque, and increasing the pitch angle to maintain the rotation speed of the wind turbine at the second rated rotation speed, wherein as the rotation speed of the wind turbine is maintained at the second rated rotation speed and the motor torque is maintained at the second torque, the power of the wind turbine is maintained at the rated power.

* * * * *